US011811432B2

(12) United States Patent
Edge

(10) Patent No.: US 11,811,432 B2
(45) Date of Patent: Nov. 7, 2023

(54) SATELLITE ACQUISITION ASSISTANCE FOR SUPPORTING SATELLITE WIRELESS ACCESS BY A MOBILE DEVICE

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/473,434

(22) Filed: Sep. 13, 2021

(65) Prior Publication Data

US 2023/0079636 A1    Mar. 16, 2023

(51) Int. Cl.
*H04W 72/30* (2023.01)
*H04B 7/185* (2006.01)
*H04W 60/04* (2009.01)
*H04B 7/204* (2006.01)

(52) U.S. Cl.
CPC ..... *H04B 7/18526* (2013.01); *H04B 7/18519* (2013.01); *H04B 7/18589* (2013.01); *H04W 60/04* (2013.01); *H04W 72/30* (2023.01); *H04B 7/2041* (2013.01)

(58) Field of Classification Search
None
See application file for complete search history.

(56) References Cited

U.S. PATENT DOCUMENTS

2021/0144670 A1 * 5/2021 Shrestha ............. H04B 7/2041

FOREIGN PATENT DOCUMENTS

WO    2021066696 A1    4/2021
WO    WO-2021066696 A1 *  4/2021   ......... H04B 7/18504

OTHER PUBLICATIONS

Xiaomi: "Discussion on Discontinuous Coverage", 3GPP TSG RAN WG2 #115, R2-2108171, 3rd Generation artnership Project (3GPP), Mobile Competence Centre, 650, Route Des Lucioles, F-06921 Sophia-Antipolis Cedex, rance, vol. RAN WG2 (Year: 2021).*

(Continued)

*Primary Examiner* — Shripal K Khajuria
(74) *Attorney, Agent, or Firm* — ArentFox Schiff LLP

(57) ABSTRACT

Methods and techniques are described for supporting satellite wireless by a user equipment (UE) using satellite acquisition information. A UE may obtain (e.g., from an AMF or gNB) acquisition information for satellite cells supporting access to a PLMN. The UE may enter an inactive state with no radio access, may later leave the inactive state, find a preferred satellite cell based on the acquisition information and access the satellite cell (e.g., camp on the cell or connect to the PLMN using the cell). The acquisition information may indicate satellite cells available at one or more predefined times for a known location of the UE or may enable a satellite cell to be found for any UE location at any time. The acquisition information may also provide timing, frequency and other information to enable a UE to access a satellite cell with reduced latency and reduced power consumption.

30 Claims, 13 Drawing Sheets

(56) References Cited

OTHER PUBLICATIONS

CMCC: "Discussion on Support of Non Continuous Coverage", 3GPP TSG-RAN WG2 Meeting #115-e, R2-2108500, 3rd Generation Partnership Project, Mobile Competence Centre, 650, Route Des Lucioles, F-06921 Sophia-Antipolis Cedex, France, vol. RAN WG2, No. Electronic Meeting, Aug. 16, 2021-Aug. 27, 2021, Aug. 21, 2021, XP052034840, 4 Pages, Section 2, Figure 1.

Lenovo., et al., "Enhancement for Idle UE Power Saving in Discontinuous Coverage", 3GPP TSG-RAN WG2 Meeting #115 electronic, R2-2107913, 3rd Generation Partnership Project, Mobile Competence Centre, 650, Route Des Lucioles, F-06921 Sophia-Antipolis Cedex, France, vol. RAN WG2, No. Electronic, Aug. 9, 2021-Aug. 27, 2021, Aug. 6, 2021, pp. 1-3, XP052034516, Section 2, Figure 2.

Partial International Search Report—PCT/US2022/074801—ISA/EPO—dated Nov. 25, 2022.

Xiaomi: "Discussion on Discontinuous Coverage", 3GPP TSG RAN W62 #115, R2-2108171, 3rd Generation Partnership Project (3GPP), Mobile Competence Centre, 650, Route Des Lucioles, F-06921 Sophia-Antipolis Cedex, France, vol. RAN WG2, No. e-Meeting, Aug. 16, 2021-Aug. 27, 2021, Aug. 6, 2021, pp. 1-3, XP052034669, Section 2.

International Search Report and Written Opinion—PCT/US2022/074801—ISA/EPO —dated Jan. 24, 2023.

\* cited by examiner

SATELLITE ACQUISITION ASSISTANCE FOR SUPPORTING SATELLITE WIRELESS ACCESS BY A MOBILE DEVICE

TECHNICAL FIELD

The present disclosure relates to providing assistance to a mobile device for acquisition of a cell provided by a communication satellite in order to access a wireless network.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

Wireless access using 4G or 5G communication protocols can be provided by communication satellites operating, for example, in low earth orbit (LEO), medium earth orbit (MEO) or in geosynchronous earth orbit (GEO). Enabling satellite access using 4G or 5G to operate more efficiently (e.g. with lower power, lower latency and/or with greater reliability) may then be desirable, e.g. in the case of a mobile device that supports IOT and may have limited power availability and other limited resources such as processing and memory.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE). The method includes obtaining, from an entity, acquisition information for a plurality of satellite cells supporting access to a serving PLMN. The method includes entering an inactive state at a first time. The UE does not have radio access during the inactive state. The method includes leaving the inactive state and entering an active state at a second time later than the first time. The method includes finding at the second time a satellite cell from the plurality of satellite cells, the finding based on the acquisition information, the satellite cell supported by a communication satellite. The method includes accessing the communication satellite using the satellite cell, the accessing based on the acquisition information.

In another innovative aspect, the subject matter described in this disclosure can be implemented in an apparatus for supporting satellite wireless access by a UE to a serving PLMN. The apparatus includes a memory storing computer-executable instructions and at least one processor coupled to the memory and configured to execute the computer-executable instructions. The at least one processor is configured to obtain, from an entity, acquisition information for a plurality of satellite cells supporting access to the serving PLMN. The at least one processor is configured to enter an inactive state at a first time, wherein the UE does not have radio access during the inactive state. The at least one processor is configured to leave the inactive state and enter an active state at a second time later than the first time. The at least one processor is configured to find at the second time a satellite cell from the plurality of satellite cells, the finding based on the acquisition information, the satellite cell supported by a communication satellite. The at least one processor is configured to access the communication satellite using the satellite cell, the accessing based on the acquisition information.

In another innovative aspect, the subject matter described in this disclosure can be implemented in an apparatus for supporting satellite wireless access by a UE to a serving PLMN. The apparatus includes means for obtaining, from an entity, acquisition information for a plurality of satellite cells supporting access to the serving PLMN. The apparatus includes means for entering an inactive state at a first time and leaving the inactive state and entering an active state at a second time later than the first time, wherein the UE does not have radio access during the inactive state. The apparatus includes means for finding at the second time a satellite cell from the plurality of satellite cells, the finding based on the acquisition information, the satellite cell supported by a communication satellite. The apparatus includes means for accessing the communication satellite using the satellite cell, the accessing based on the acquisition information.

In another innovative aspect, the subject matter described in this disclosure can be implemented in non-transitory computer-readable medium storing computer executable code for supporting satellite wireless access by a UE to a serving PLMN. The code when executed by a processor causes the processor to obtain, from an entity, acquisition information for a plurality of satellite cells supporting access to the serving PLMN. The code when executed by a processor causes the processor to enter an inactive state at a first time, wherein the UE does not have radio access during the inactive state. The code when executed by a processor causes the processor to leave the inactive state and enter an active state at a second time later than the first time. The code when executed by a processor causes the processor to find at the second time a satellite cell from the plurality of satellite cells based on the acquisition information, the satellite cell supported by a communication satellite. The code when executed by a processor causes the processor to access the communication satellite using the satellite cell based on the acquisition information.

Figure 1:
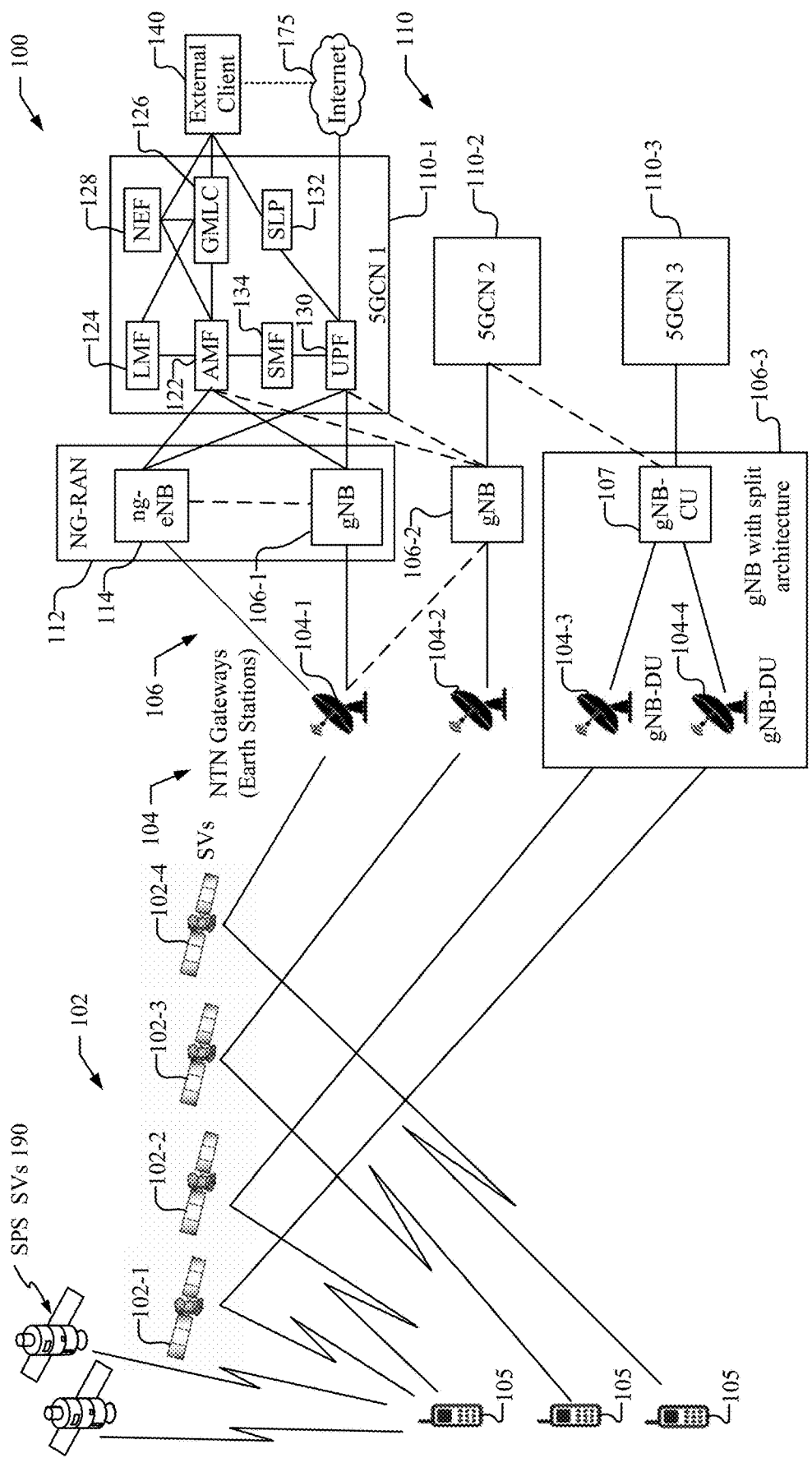
FIG. 1 shows a diagram of a communication system with a network architecture having transparent space vehicles (SVs) that is capable of supporting satellite access to a wireless network.

Like reference symbols in the various drawings indicate like elements, in accordance with certain example implementations. In addition, multiple instances of an element may be indicated by following a first number for the element with a letter or a hyphen and a second number. For example, multiple instances of an element 102 may be indicated as 102-1, 102-2, 102-3 etc. When referring to such an element using only the first number, any instance of the element is to be understood (e.g. element 102 in the previous example would refer to elements 102-1, 102-2, 102-3).

DETAILED DESCRIPTION

Satellites, also referred to as space vehicles (SVs) or communication satellites, may be used in communication systems, for example, using gateways and one or more satellites to relay communication signals between the gateways and one or more UEs. A UE, for example, may access a satellite (instead of a terrestrial base station) which may be connected to an earth station (ES), which is also referred to as a ground station or Non-Terrestrial Network (NTN) Gateway. The earth station in turn would connect to an element in a 5G Network such as a modified base station (without a terrestrial antenna) or a network node in a 5G Core Network (5GCN). This element would in turn provide access to other elements in the 5G Network and ultimately to entities external to the 5G Network such as Internet web servers and other user devices.

A rationale for 5G (or other cellular network) satellite access for UEs may include ubiquitous outdoor coverage for both users and Mobile Network Operators (MNOs). For example, in many countries, including the United States, unavailable or poor cellular coverage is a common problem. Moreover, cellular access is not always possible even when there is normally good cellular coverage. For example, cellular access may be hampered due to congestion, physical obstacles, a local cellular outage caused by weather (e.g. a hurricane or tornado), or a local power outage. Satellite access to cellular networks could provide a new independent access potentially available everywhere outdoors. Current satellite capable phones for low Earth orbit (LEO) SVs may be of similar size to a cellular smartphone and, thus, mobile NR support with satellite capable phones need not produce a significant increase in the size of phones. Moreover, satellite capable smartphones may help drive handset sales, and may add revenue for carriers. Potential users, for example, may include anyone with limited or no cellular access, anyone wanting a backup to a lack of cellular access, and anyone involved in public safety or who otherwise needs (nearly) 100% reliable mobile communication. Additionally, some users may desire an improved or more reliable E911 service, e.g., for a medical emergency or vehicle trouble in remote areas. Additional user cases can include providing wireless communication access to UEs located outdoors and associated with automated or IOT devices such as a UEs enabling communication with and possibly control of unmanned Aerial Vehicles (UAVs), driverless vehicles, automated machinery used in farming, forestry or mining, smart meters, monitoring devices (e.g. for monitoring of weather, traffic, crowds, hazardous conditions).

The use of 5G satellite access may provide other benefits. For example, 5G satellite access may reduce Mobile Network Operator (MNO) infrastructure cost. For example, an MNO may use satellite access to reduce terrestrial base stations, such as NR NodeBs, also referred to as gNBs, and backhaul deployment in sparsely populated areas. Further, 5G satellite access may be used to overcome internet blockage, e.g., in certain countries. Additionally, 5G satellite access may provide diversification to Space Vehicle Operators (SVOs). For example, 5G NR satellite access could provide another revenue stream to SVOs who would otherwise provide fixed Internet access.

A possible problem with 4G and 5G satellite access concerns reducing UE power expenditure when selecting and accessing a new cell. UE power expenditure with satellite access could be much higher than with terrestrial wireless access because cells supported by communication satellites may be constantly changing due to movement of the satellites. Hence, a previously used satellite cell may not be available to be reselected by a UE at a later time. In addition, a UE supporting IOT may preferably need to select a satellite cell with a lifetime (e.g. 1 or 2 minutes) that is sufficiently long to enable the UE to complete a pending transaction (e.g. to send a monitoring or status report and/or receive new instructions from a remote controller) without needing to handover to another satellite cell which could consume more UE power and delay completion of the transaction. Furthermore, finding and accessing a satellite cell with low latency may be another desirable objective in order to enable rapid communication between a UE and some external device such as another UE, a controller or a website with which the UE needs to communicate.

As a point of terminology, wireless cells supported by satellites (or SVs) are referred to herein as "satellite cells", as "radio cells" or simply as "cells" when there is prior context information that a "cell" is a "satellite cell". Satellite cells would be distinct from wireless cells supported by terrestrial base stations and access points.

In an aspect, the present disclosure provides for satellite acquisition assistance for UEs such as internet of things (IoT) devices. In particular, a UE such as an IOT device may support an inactive state in which the UE does not have radio access. The inactive state may be used to reduce power consumption of the UE. When the UE leaves the inactive state (e.g. in order to communicate with an external device), however, the UE may not simply reconnect to a previous satellite cell due to the dynamic nature of such cells. A random cell search for a satellite cell by the UE may consume UE power and may select a cell that is not suitable for communication or is less suitable than other cells that may be available. For example, a cell may be selected with a longer SV range to the UE than for some other cells (which may increase UE power consumption for both transmission and reception) and/or which has a short lifetime (e.g. less than 30 seconds) at the location of the UE which may lead to handover of the UE to another cell. The present disclosure improves acquisition of a satellite cell after a UE leaves an inactive state by providing the UE with cell acquisition information before the UE enters the inactive state. The cell acquisition information may depend on whether a location of the UE and/or time when the UE leaves the inactive state is known in advance. The UE may use the cell acquisition information to find a satellite cell and access a communication satellite using the satellite cell. Accordingly, the UE may more quickly access a satellite cell and consume less power than if the UE performs a random cell search.

It is noted that the terms space vehicle (SV), communication satellite and satellite can be synonymous and are accordingly used here interchangeably. In some cases, an SV (or satellite) can be a navigation SV (or satellite) such as an SV for GPS, Galileo, GLONASS or Beidou. An SV which functions as a navigation SV but possibly not as a communication SV is labelled and referred to explicitly herein to avoid confusion with a communication SV that may not support navigation. It is further noted that communication SVs described herein are sometimes assumed herein to be non-GEO (e.g. LEO or MEO). The reason is that satellite cell acquisition may be inherently more difficult and more likely to produce higher UE power consumption and higher latency for a non-GEO SV than for a GEO SV due to movement and changes in satellite cells available at any location. Thus, while the techniques and methods described herein can be applied to cells supported by GEO SVs, they may be of greater benefit to cells supported by non-GEO SVs.

FIG. 1 shows a diagram of a communication system 100 capable of supporting satellite access using 5G New Radio (NR) or some other wireless access type such as Code Division Multiple Access (CDMA), according to an embodiment. FIG. 1 illustrates a network architecture with transparent space vehicles (SVs). A transparent SV may implement frequency conversion and a radio frequency (RF) amplifier in both uplink (UL) and downlink (DL) directions and may correspond to an analog RF repeater. A transparent SV, for example, may receive uplink (UL) signals from all served UEs and may redirect the combined signals DL to an earth station without demodulating or decoding the signals. Similarly, a transparent SV may receive an UL signal from an earth station and redirect the signal DL to served UEs without demodulating or decoding the signal. However, the SV may frequency convert received signals and may amplify and/or filter received signals before transmitting the signals.

The communication system 100 comprises a number of UEs 105, a number of SVs 102 (e.g., SV 102-1, 102-2, 102-3, and 102-4), a number of Non-Terrestrial Network (NTN) gateways 104-1 to 104-4 (collectively referred to herein as NTN gateways 104) (sometimes referred to herein simply as gateways 104, earth stations 104, or ground stations 104), a number of satellite NodeBs (gNBs) 106-1 to 106-3 (collectively referred to herein as gNBs 106) capable of communication with UEs via SVs 102 and that are part of a Next Generation (NG) Radio Access Network (RAN) (NG-RAN) 112.

It is noted that the term "gNB" (or "gNodeB") traditionally refers to an NR NodeB base station used for terrestrial access with a New Radio (NR) radio interface. The same term (gNB) may also be used to refer to a base station supporting satellite access with an NR radio interface. The two variants of gNB (satellite and terrestrial) may support many of the same functions, protocols and interfaces, but are also distinct in other ways. To distinguish gNBs supporting terrestrial access from gNBs supporting satellite access, different labels are used herein. A gNB could also support both terrestrial and satellite NR access, though, for simplification, this is not further discussed here.

The communication system 100 is illustrated as further including components of a number of Fifth Generation (5G) networks including 5G Core Networks (5GCNs) 110-1 to 110-3 (collectively referred to as 5GCNs 110). The 5GCNs 110 may be public land mobile networks (PLMN) that may be located in the same or in different countries. FIG. 1 illustrates various components within 5GCN1 110-1 that may operate with the NG-RAN 112. It should be understood that 5GCN2 110-2 and 5GCN3 110-3 may include identical, similar or different components and associated NG-RANs, which are not illustrated in FIG. 1 in order to avoid unnecessary obfuscation. A 5G network may also be referred to as a New Radio (NR) network; NG-RAN 112 may be referred to as a 5G RAN or as an NR RAN; and 5GCN 110 may be referred to as an NG Core network (NGC). The communication system 100 may further utilize information from navigation space vehicles (SVs) 190 for a Satellite Positioning System (SPS) including Global Navigation Satellite Systems (GNSS) like Global Positioning System (GPS), GLObal NAvigation Satellite System (GLONASS), Galileo or Beidou or some other local or regional SPS, such as Indian Regional Navigation Satellite System (IRNSS), European Geostationary Navigation Overlay Service (EGNOS), or Wide Area Augmentation System (WAAS), all of which are sometimes referred to herein as GNSS. It is noted that SVs 190 act as navigation SVs and are separate and distinct from SVs 102, which act as communication SVs. However, it is not precluded that some of SVs 190 may also act as some of SVs 102 and/or that some of SVs 102 may also act as some of SVs 190. In some implementations, for example, the SVs 102 may be used for both communication and positioning. Additional components of the communication system 100 are described below. The communication system 100 may include additional or alternative components.

Permitted connections in the communication system 100 having the network architecture with transparent SVs illustrated in FIG. 1, allow a gNB 106 to access multiple Earth stations 104 and/or multiple SVs 102. A gNB 106, e.g., illustrated by gNB 106-2, may also be shared by multiple PLMNs (5GCNs 110), which may all be in the same country or possibly in different countries, and an Earth station 104, e.g., illustrated by Earth station 104-1, may be shared by more than one gNB 106.

It should be noted that FIG. 1 provides only a generalized illustration of various components, any or all of which may be utilized as appropriate, and each of which may be duplicated or omitted, as necessary. Specifically, although only three UEs 105 are illustrated, it will be understood that many UEs (e.g., hundreds, thousands, millions, etc.) may utilize the communication system 100. Similarly, the communication system 100 may include a larger (or smaller) number of SVs 190, SVs 102, earth stations 104, gNBs 106, NG-RAN 112, ng-eNBs 114, 5GCNs 110, external clients 140, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, 4G Long Term Evolution (LTE), etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 110), etc. The UE 105 may also support wireless communication using a Wireless Local Area Network (WLAN) which may connect to other networks (e.g. the Internet) using a Digital Subscriber Line (DSL) or packet cable for example. The UE 105 further supports wireless communications using space vehicles, such as SVs 102. The use of one or more of these RATs may allow the UE 105 to communicate with an external client 140 (via elements of 5GCN 110 not shown in FIG. 1, or possibly via a Gateway Mobile Location Center (GMLC) 126).

The UE 105 may include a single entity or may include multiple entities such as in a personal area network where a user may employ audio, video and/or data I/O devices and/or body sensors and a separate wireline or wireless modem.

The UE 105 may support position determination, e.g., using signals and information from space vehicles 190 in an SPS, such as GPS, GLONASS, Galileo or Beidou or some other local or regional SPS such as IRNSS, EGNOS or WAAS, all of which may be generally referred to herein as GNSS. Position measurements using SPS are based on measurements of propagation delay times of SPS signals broadcast from a number of orbiting satellites to a SPS receiver in the UE 105. Once the SPS receiver has measured the signal propagation delays for each satellite, the range to each satellite can be determined and precise navigation information including 3-dimensional position, velocity and time of day of the SPS receiver can then be determined using the measured ranges and the known locations of the satellites. Positioning methods which may be supported using SVs 190 may include Assisted GNSS (A-GNSS), Real Time Kinematic (RTK), Precise Point Positioning (PPP) and Differential GNSS (DGNSS). Information and signals from SVs 102 may also be used to support positioning. The UE 105 may further support positioning using terrestrial positioning methods, such as Downlink (DL) Time Difference of Arrival (DL-TDOA), Enhanced Cell ID (ECID), Round Trip signal propagation Time (RTT), multi-cell RTT, angle of arrival (AOA), angle of departure (AOD), time of arrival (TOA), receive-transmit transmission-time difference (RxTx) and/or other positioning methods.

An estimate of a location of the UE 105 may be referred to as a geodetic location, location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The UEs 105 are configured to communicate with 5GCNs 110 via the SVs 102, earth stations 104, and gNBs 106. As illustrated by NG-RAN 112, the NG-RANs associated with the 5GCNs 110 may include one or more gNBs 106. The NG-RAN 112 may further include a number of terrestrial gNBs (not shown in FIG. 1), that are not capable of communication with UEs via SVs 102. Pairs of terrestrial and/or satellite base stations, e.g., a terrestrial gNB and gNB 106-1 in NG-RAN 112, may be connected to one another using terrestrial links—e.g. directly or indirectly via other terrestrial gNBs or gNBs 106 and communicate using an Xn interface. Access to the 5G network is provided to UEs 105 via wireless communication between each UE 105 and a serving gNB 106, via an SV 102 and an earth station 104. The gNBs 106 may provide wireless communications access to the 5GCN 110 on behalf of each UE 105 using 5G NR. 5G NR radio access may also be referred to as NR radio access or as 5G radio access and may be as defined by the Third Generation Partnership Project (3GPP).

Base stations (BSs) in the NG-RAN 112 shown in FIG. 1 may also or instead include a next generation evolved Node B 114, also referred to as an ng-eNB 114. An ng-eNB 114 may be connected to one or more gNBs 106 and/or terrestrial gNBs in NG-RAN 112—e.g. directly or indirectly via other gNBs 106, terrestrial gNBs and/or other ng-eNBs 114. An ng-eNB 114 may provide LTE wireless access and/or evolved LTE (eLTE) wireless access to a UE 105. An ng-eNB 114 may be connected to an NTN gateway 104 and support satellite wireless access for UEs 105 (e.g. IOT UEs) using enhanced Machine Type Communication (eMTC), also referred to as LTE-M, or Narrowband IOT (NB-IOT). EMTC and NB-IOT are variants of LTE in which lower bandwidth is provided to, and supported by, UEs 105 and which enable support of UEs 105 with low resource capability (e.g. lower processing and memory availability) and limited power availability (e.g. a UE 105 with a battery which should provide power to the UE 105 for 2 to 10 years before being replaced or recharged). NB-IOT and eMTC may be preferred to NR for support of IOT UEs with very limited resources and power availability.

The term "satellite NodeB" is used herein to refer to a gNB (e.g. gNB 106) or ng-eNB (e.g. ng-eNB 114) that provides satellite wireless access, e.g. as exemplified in FIG. 1. A satellite Node B may be regenerative, as described later for FIGS. 2 and 3, and/or may in some embodiments correspond to an evolved Node B (eNB) that provides satellite wireless access (e.g. using LTE, eMTC or NB-IOT) to a core network that is an enhanced packet core (EPC). A satellite NodeB may be referred to by other names or terms such as an sNB or a "satellite node" or "satellite access node." Satellite NodeBs corresponding to gNBs 106 are not the same as terrestrial gNBs, but may be based on a terrestrial gNB with additional capability. For example, a gNB 106 may terminate the radio interface and associated radio interface protocols to UEs 105 and may transmit DL signals to UEs 105 and receive UL signals from UEs 105 via SVs 102 and earth stations 104. A gNB 106 may also support signaling connections and voice and data bearers to UEs 105 and may support handover of UEs 105 between different satellite cells for the same SV 102, between different SVs 102 and/or between different gNBs 106. In some systems, a gNB 106 may be referred to as a gNB or as an enhanced gNB. The gNBs 106 may be configured to manage moving satellite beams (for LEO SVs) and associated mobility of UEs 105. The gNBs 106 may assist in the handover (or transfer) of SVs 102 between different Earth stations 104, different gNBs 106, and between different countries. The gNBs 106 may hide or obscure specific aspects of connected SVs 102 from the 5GCN 110, e.g. by interfacing to a 5GCN 110 in the same way or in a similar way to a terrestrial gNB, and may avoid a 5GCN 110 from having to maintain configuration information for SVs 102 or perform mobility management related to SVs 102. The gNBs 106 may further assist in sharing of SVs 102 over multiple countries. The gNBs 106 may communicate with one or more earth stations 104, e.g., as illustrated by gNB 106-2 communicating with earth stations 104-2 and 104-1. The gNBs 106 may be separate from earth stations 104, e.g., as illustrated by gNBs 106-1 and 106-2, and earth stations 104-1 and 104-2. The gNBs 106 may include or may be combined with one or more earth stations 104, e.g., using a split architecture. For example, gNB 106-3 is illustrated with a split architecture, with a gNB central unit (gNB-CU) 107 and the earth stations 104-3 and 104-4 acting as Distributed Units (DUs). A gNB 106 may typically be fixed on the ground with transparent SV operation. In one implementation, one gNB 106 may be physically combined with, or physically connected to, one earth station 104 to reduce complexity and cost.

Satellite NodeBs corresponding to ng-eNBs 114 are not the same as terrestrial ng-eNBs, but may be based on a terrestrial ng-eNB with additional capability. The differences between ng-eNBs 114 and terrestrial ng-eNBs and the additional satellite related functions, capabilities and uses of an ng-eNB 114 may be similar to that described above for gNBs 106.

The earth stations 104 may be shared by more than one gNB 106 and/or more than one ng-eNB 114 and may communicate with UE 105 via the SVs 102. An earth station 104 may be dedicated to just one SVO and to one associated constellation of SV 102 and hence may be owned and managed by the SVO. While earth stations 104 may be included within an ng-eNB 114 or gNB 106, e.g., as a gNB-DU within gNB 106-3, this may only occur when the same SVO or the same MNO owns both the ng-eNB 114 or gNB 106 and the included earth stations 104. Earth stations 104 may communicate with SVs 102 using control and user plane protocols that may be proprietary to an SVO. The control and user plane protocols between earth stations 104 and SVs 102 may: (i) establish and release Earth Station 104 to SV 102 communication links, including authentication and ciphering; (ii) update SV software and firmware; (iii) perform SV Operations and Maintenance (O&M); (iv) control satellite beams (e.g., direction, power, on/off status) and mapping between satellite beams and earth station uplink (UL) and downlink (DL) payload; and (v) assist with handoff of an SV 102 or satellite cell to another Earth station 104.

As noted, while FIG. 1 depicts nodes configured to communicate according to 5G NR and LTE communication protocols for an NG-RAN 112, nodes configured to communicate according to other communication protocols may be used, such as, for example, an LTE protocol (e.g. supporting UE 105 satellite access using eMTC or NB-IOT) for an Evolved Universal Mobile Telecommunications System (UMTS) Terrestrial Radio Access Network (E-UTRAN) or an IEEE 802.11x protocol for a WLAN. For example, in a 4G Evolved Packet System (EPS) providing LTE wireless access to UE 105, a RAN may comprise an E-UTRAN, which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 112 and the EPC corresponds to 5GCN 110 in FIG. 1. In such a case, satellite NodeBs may comprise eNBs in an E-UTRAN connecting to NTN gateways 104 and to an EPC. The methods and techniques described herein for support of satellite acquisition assistance may be applicable to such other networks.

The gNBs 106, ng-eNB 114 and terrestrial gNBs may communicate with an Access and Mobility Management Function (AMF) 122 in a 5GCN 110, which, for positioning functionality, may communicate with a Location Management Function (LMF) 124. For example, the gNBs 106 and ng-eNB 114 may provide an N2 interface to the AMF 122. An N2 interface between a gNB 106 or ng-eNB 114 and a 5GCN 110 may be the same as an N2 interface supported between a terrestrial gNB or terrestrial ng-eNB and a 5GCN 110 for terrestrial NR or terrestrial LTE access by a UE 105 and may use the Next Generation Application Protocol (NGAP) defined in 3GPP Technical Specification (TS) 38.413 between a gNB 106 or ng-eNB 114 and the AMF 122. The AMF 122 may support mobility of the UE 105, including satellite cell change and handover and may participate in supporting a signaling connection to the UE 105 and possibly data and voice bearers for the UE 105. The LMF 124 may support positioning of the UE 105 when UE accesses the NG-RAN 112 and may support position procedures/methods such as A-GNSS, DL-TDOA, RTK, PPP, DGNSS, ECID, AOA, AOD, multi-cell RTT and/or other positioning procedures including positioning procedures based on communication signals from one or more SVs 102. The LMF 124 may also process location services requests for the UE 105, e.g., received from the AMF 122 or from a Gateway Mobile Location Center (GMLC) 126. The LMF 124 may be connected to AMF 122 and/or to GMLC 126. In some embodiments, a node/system that implements the LMF 124 may additionally or alternatively implement other types of location-support modules, such as an Enhanced Serving Mobile Location Center (E-SMLC). It is noted that in some embodiments, at least part of the positioning functionality (including derivation of a UE 105's location) may be performed at the UE 105 (e.g., using signal measurements obtained by UE 105 for signals transmitted by SVs 102, SVs 190, terrestrial gNBs and assistance data provided to the UE 105, e.g. by LMF 124).

The GMLC 126 may support a location request for the UE 105 received from an external client 140 and may forward such a location request to the AMF 122 for forwarding by the AMF 122 to the LMF 124 or may forward the location request directly to the LMF 124. A location response from the LMF 124 (e.g. containing a location estimate for the UE 105) may be similarly returned to the GMLC 126 either directly or via the AMF 122, and the GMLC 126 may then return the location response (e.g., containing the location estimate) to the external client 140. The GMLC 126 is shown connected to both the AMF 122 and LMF 124 in FIG. 1 though only one of these connections may be supported by 5GCN 110 in some implementations.

A Network Exposure Function (NEF) 128 may be included in 5GCN 110, e.g., connected to the GMLC 126 and the AMF 122. In some implementations, the NEF 128 may be connected to communicate directly with the external client 140. The NEF 128 may support secure exposure of capabilities and events concerning 5GCN 110 and UE 105 to an external client 140 and may enable secure provision of information from external client 140 to 5GCN 110.

A User Plane Function (UPF) 130 may support voice and data bearers for UE 105 and may enable UE 105 voice and data access to other networks such as the Internet 175. The UPF 130 may be connected to gNBs 106 and ng-eNBs 114. UPF 130 functions may include: external Protocol Data Unit (PDU) session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 130 may be connected to a Secure User Plane Location (SUPL) Location Platform (SLP) 132 to enable support of positioning of UE 105 using SUPL. SLP 132 may be further connected to or accessible from external client 140.

As illustrated, a Session Management Function (SMF) 134 connects to the AMF 122 and the UPF 130. The SMF 134 may have the capability to control both a local and a central UPF within a PDU session. SMF 134 may manage the establishment, modification and release of PDU sessions for UE 105, perform IP address allocation and management for UE 105, act as a Dynamic Host Configuration Protocol (DHCP) server for UE 105, and select and control a UPF 130 on behalf of UE 105.

The external client 140 may be connected to the core network 110 via the GMLC 126 and/or the SLP 132, and/or NEF 128. The external client 140 may optionally be connected to the core network 110 and/or to a location server, which may be, e.g., an SLP, that is external to 5GCN 110, via the Internet 175. The external client 140 may be connected to the UPF 130 directly (not shown in FIG. 1) or through the Internet 175. The external client 140 may be a server, a web server, or a user device, such as a personal computer, a UE, etc.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 110 may be configured to control different air interfaces. For example, in some embodiments, 5GCN 110 may be connected to a WLAN, either directly or using a Non-3GPP InterWorking Function (N3IWF, not shown FIG. 1) in the 5GCN 110. For example, the WLAN may support IEEE 802.11 WiFi access for UE 105 and may comprise one or more WiFi APs. Here, the N3IWF may connect to the WLAN and to other elements in the 5GCN 110 such as AMF 122.

Support of transparent SVs 102 with the network architecture shown in FIG. 1 may impact the communication system as follows. The 5GCN 110 may treat a satellite RAT as a new type of terrestrial RAT with longer delay, reduced bandwidth and higher error rate. Consequently, while there may be some impact to Protocol Data Unit (PDU) session establishment and mobility management (MM) and connection management (CM) procedures. Impacts to an AMF 122 (or LMF 124) may be small—e.g. such as providing preconfigured data for fixed tracking areas (TAs) and cells to a UE 105 during Registration. There may be no impact to the SVs 102. The SVs 102 may be shared with other services (e.g. satellite TV, fixed Internet access) with 5G NR mobile access for UEs added in a transparent manner. This may enable legacy SVs 102 to be used and may avoid the need to deploy a new type of SV 102. Further, the gNBs 106 and ng-eNBs 114 may be fixed and may be configured to support one country and one or more PLMNs in that country. The gNBs 106 and ng-eNBs 114 may need to assist assignment and transfer of SVs 102 and satellite cells between gNBs 106 or ng-eNBs 114 and earth stations 104 and support handover of UEs 105 between satellite cells, SVs 102, other gNBs 106 and/or other ng-eNBs 114. Thus, the gNB 106 may differ from a terrestrial gNB and the ng-eNB 114 may differ from a terrestrial ng-eNB. Additionally, a coverage area of a gNB 106 or ng-eNB 114 may be much larger than the coverage area of a terrestrial gNB or terrestrial ng-eNB.

In some implementations, the satellite beam coverage of an SV 102 may be large, e.g., up to or greater than 1000 kilometers (kms) across, and may provide access to more than one country. An earth station 104 may be shared by multiple gNBs 106 and/or by multiple ng-eNBs 114 (e.g., earth station 104-1 may be shared by gNBs 106-1 and 106-2 and by ng-eNB 114), and a gNB 106 and/or ng-eNB 114 may be shared by multiple core networks in separate PLMNs located in the same country or in different countries (e.g., gNB 106-2 may be shared by 5GCN1 110-1 and 5GCN2 110-1, which may be in different PLMNs in the same country or in different countries).

To simplify later referencing to a satellite NodeB supporting transparent SV wireless access, any later reference herein to a gNB 106 can also be considered to refer, as an alternative, to an ng-eNB 114 or to a satellite NodeB that comprises an eNB accessing an EPC.

Figure 2:
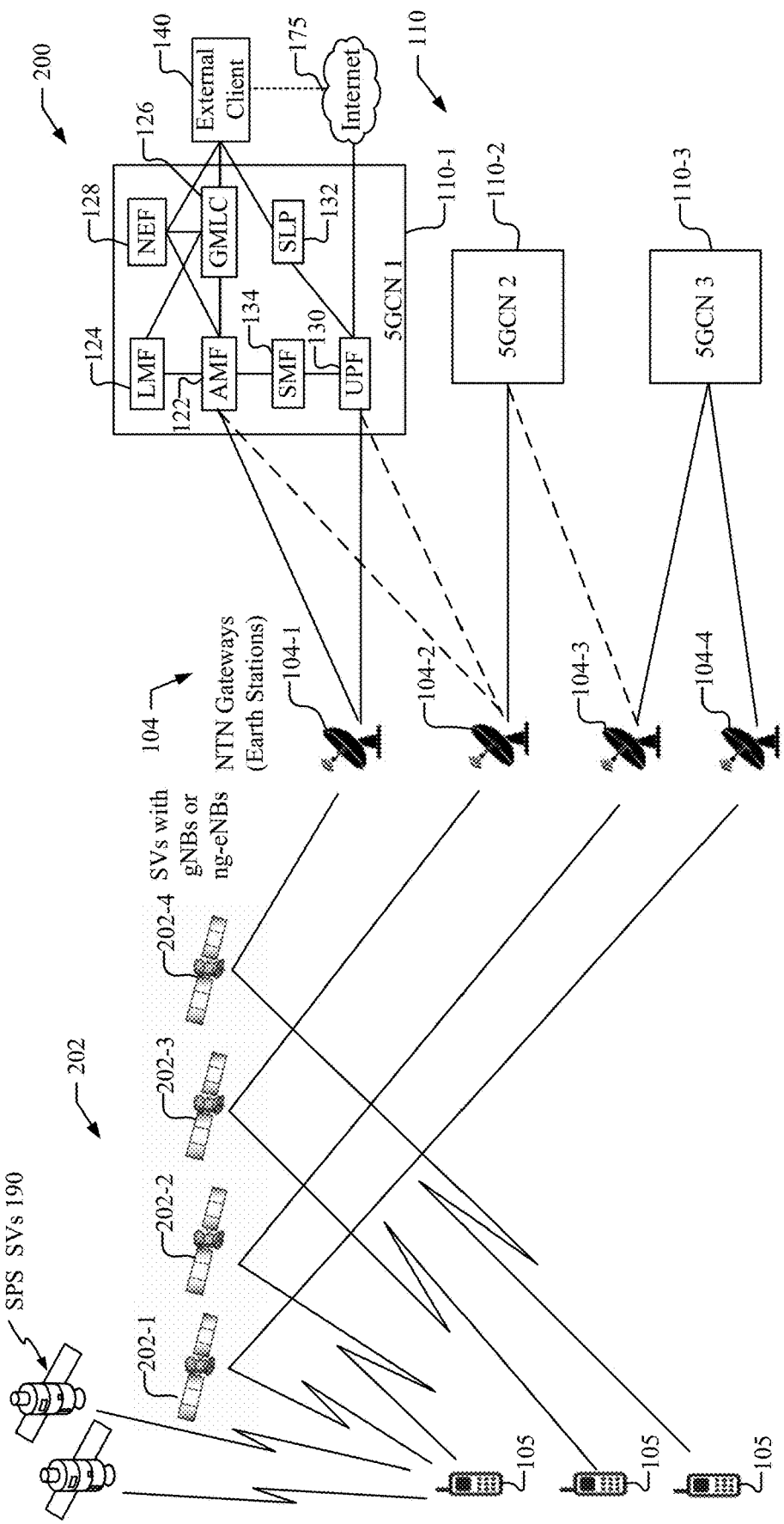
FIG. 2 shows a diagram of a communication system with a network architecture having regenerative SVs that is capable of supporting satellite access to a wireless network.

FIG. 2 shows a diagram of a communication system 200 capable of supporting satellite access using 5G New Radio (NR) or some other wireless access type such as Code Division Multiple Access (CDMA), according to an embodiment. The network architecture shown in FIG. 2 is similar to that shown in FIG. 1, like designated elements being similar or the same. FIG. 2, however, illustrates a network architecture with regenerative SVs 202-1, 202-2, 202-3, and 202-4 (collectively SVs 202), as opposed to transparent SVs 102 shown in FIG. 1. A regenerative SV 202, unlike a transparent SV 102, includes an on-board satellite NodeB, referred to as a gNB 202, which may include the functional capability of a gNB 106, and is sometimes referred to herein as an SV/gNB 202. The NG-RAN 112 is illustrated as including the SV/gNBs 202. Reference to a gNB 202 is used herein when referring to SV/gNB 202 functions related to communication with UEs 105 and 5GCNs 110, whereas reference to an SV 202 is used when referring to SV/gNB 202 functions related to communication with earth stations 104 and with UEs 105 at a physical radio frequency level. However, there may be no precise delimitation of an SV 202 versus a gNB 202.

An onboard gNB 202 may perform some or all of the same functions as a gNB 106 as described previously. For example, a gNB 202 may terminate the radio interface and associated radio interface protocols to UEs 105 and may transmit DL signals to UEs 105 and receive UL signals from UEs 105, which may include encoding and modulation of transmitted signals and demodulation and decoding of received signals. A gNB 202 may also support signaling connections and voice and data bearers to UEs 105 and may support handover of UEs 105 between different satellite cells for the same gNB 202 and between different gNBs 202. The gNBs 202 may assist in the handover (or transfer) of SVs 202 between different Earth stations 104, different 5GCNs 110, and between different countries. The gNBs 202 may hide or obscure specific aspects of SVs 202 from the 5GCN 110, e.g. by interfacing to a 5GCN 110 in the same way or in a similar way to a terrestrial gNB. The gNBs 202 may further assist in sharing of SVs 202 over multiple countries. The gNBs 202 may communicate with one or more earth stations 104 and with one or more 5GCNs 110 via the earth stations 104. In some implementations, gNBs 202 may communicate directly with other gNBs 202 using Inter-Satellite Links (ISLs) (not shown in FIG. 2), which may support an Xn interface between any pair of gNBs 202.

With LEO SVs, an SV/gNB 202 needs to manage moving satellite cells with coverage in different countries at different times. Earth stations 104 may be connected directly to the 5GCN 110, as illustrated. For example, as illustrated, earth station 104-1 may be connected to AMF 122 and UPF 130 of 5GCN1 110-1, while earth station 104-2 may be similarly connected to 5GCN2 110-2, and earth stations 104-3 and 104-4 are connected to 5GCN3 110-3. The earth stations 104 may be shared by multiple 5GCNs 110, for example, if Earth stations 104 are limited. For example, in some implementations (illustrated with dotted lines), earth station 104-2 may be connected to both 5GCN1 110-1 and 5GCN2 110-2, and earth station 104-3 may be connected to both 5GCN2 110-2 and 5GCN3 110-3. The 5GCN 110 may need to be aware of SV 202 coverage areas in order to page UEs 105 and to manage handover. Thus, as can be seen, the network architecture with regenerative SVs may have more impact and complexity with respect to both gNBs 202 and 5GCNs 110 than the network architecture with transparent SVs 102 shown in FIG. 1.

Support of regenerative SVs with the network architecture shown in FIG. 2 may impact the communication system 200 as follows. The 5GCN 110 may be impacted if fixed TAs and cells are not supported, since core components of mobility management and regulatory services, which are typically based on fixed cells and fixed TAs for terrestrial PLMNs, might have to be replaced by a new system (e.g. based on UE 105 location). If fixed TAs and fixed cells are supported, a 5GCN 110 (e.g. the AMF 122) may need to map any fixed TA to one or SVs 202 with current radio coverage of the TA when performing paging of a UE 105 that is located in this TA. This could require configuration in the 5GCN 110 of long term orbital data for SVs 202 (e.g. obtained from an SVO for SVs 202) and could add significant new impact to a 5GCN 110.

Legacy SVs would need a substantial software (SW) update to support gNB 202 functions, which may not be feasible. An SV 202 would also need to fully support all UEs 105 accessing the SV 202, which could be problematic with a legacy SV due to limited processing and storage capability. Hence, an SV 202 would probably need to comprise new hardware (HW) and SW rather than being based on a SW upgrade to an existing SV. A new SV/gNB 202 may need to support regulatory and other requirements for multiple countries. A GEO SV 202 coverage area would typically include several or many countries, whereas a LEO or medium earth orbit (MEO) SV 202 would typically orbit over many countries. Support of fixed TAs and fixed cells may then require that a SV/gNB 202 be configured with fixed TAs and fixed cells for an entire worldwide coverage area. Alternatively, AMFs 122 (or LMFs 124) in individual 5GCNs 110 could support fixed TAs and fixed cells for the associated PLMN to reduce SV/gNB 202 complexity and at the expense of more 5GCN 110 complexity. Additionally, SV/gNB 202 to SV/gNB 202 ISLs would typically change dynamically as relative SV/gNB 202 positions change, making Xn related procedures more complex.

For support of satellite access using LTE, NB-IOT or eMTC, a regenerative SV 202 can include an on-board satellite NodeB which may include the functional capability of either an ng-eNB 114 or an eNB instead of the functional capability of a gNB 106 that supports NR access. The functions of the SV 202 and the on-board satellite NodeB and the impacts to a 5GCN 110 can then be the same as, or similar to, those described above for an SV 202 with an on board satellite NodeB that corresponds to a gNB 106 supporting NR access, but with the difference that any reference to a gNB 202 now refers to an ng-eNB or an eNB, and any reference to a 5GCN 110 or 5GCN 110 entity (e.g. an AMF 122 or UPF 130) now refers, respectively, to an EPC or a corresponding EPC entity (e.g. a Mobility Management Entity (MME) or a Serving Gateway (SGW) plus Packet Data Gateway (PDG)) for a gNB 202 that corresponds to an eNB. Accordingly, reference to a gNB 202, an SV/gNB 202 or an SV 202 herein can be considered to allow for the case where the satellite NodeB component of the SV 202 supports the functionality of an ng-eNB 114 or an eNB.

Figure 3:
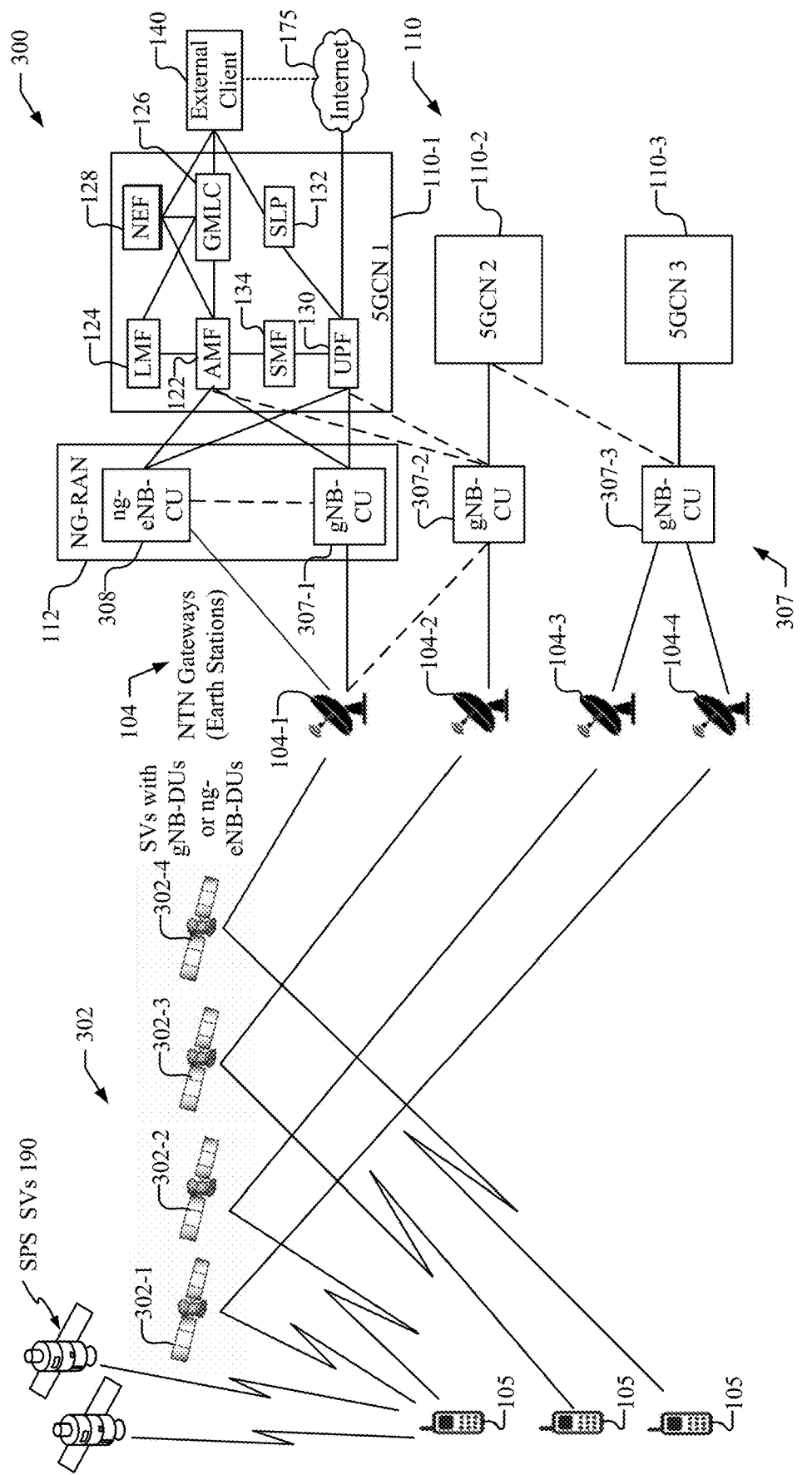
FIG. 3 shows a diagram of a communication system with a network architecture having regenerative SVs and a split satellite Node B (gNB) architecture that is capable of supporting satellite access to a wireless network.

FIG. 3 shows a diagram of a communication system 300 capable of supporting satellite access using 5G New Radio (NR) or some other wireless access type such as Code Division Multiple Access (CDMA), according to an embodiment. The network architecture shown in FIG. 3 is similar to that shown in FIGS. 1 and 2, like designated elements being similar or the same. FIG. 3, however, illustrates a network architecture with regenerative SVs 302-1, 302-2, 302-3, and 302-4 (collectively referred to as SVs 302), as opposed to transparent SVs 102 shown in FIG. 1, and with a split architecture for the satellite NodeBs. The satellite NodeBs, referred to as gNBs 307 (e.g., gNB 307-1, 307-2, and 307-3), include a central unit and may sometimes be referred as gNB-CU 307, and a regenerative SV 302, unlike a transparent SV 102, includes an on-board gNB Distributed Unit (gNB-DU) 302, and is sometimes referred to herein as an SV/gNB-DU 302. Reference to a gNB-DU 302 is used herein when referring to SV/gNB 302 functions related to communication with UEs 105 and gNB-CUs 307, whereas reference to an SV 302 is used when referring to SV/gNB-DU 302 functions related to communication with earth stations 104 and with UEs 105 at a physical radio frequency level. However, there may be no precise delimitation of an SV 302 versus a gNB-DU 302.

Each gNB-DU 302 communicates with one ground based gNB-CU 307 via one or more earth stations 104. One gNB-CU 307 together with the one or more gNB-DUs 302 which are in communication with the gNB-CU 307 performs functions, and may use internal communication protocols, which are similar to or the same as a gNB with a split architecture as described in 3GPP TS 38.401. Here a gNB-DU 302 corresponds to and performs functions similar to or the same as a gNB Distributed Unit (gNB-DU) defined in TS 38.401, while a gNB-CU 307 corresponds to and performs functions similar to or the same as a gNB Central Unit (gNB-CU) defined in TS 38.401. For example, a gNB-DU 302 and a gNB-CU 307 may communicate with one another using an F1 Application Protocol (FLAP) as defined in 3GPP TS 38.473 and together may perform some or all of the same functions as a gNB 106 or gNB 202 as described previously. To simplify references to different types of gNB is the description below, a gNB-DU 302 may sometimes be referred to a gNB 302 (without the "DU" label), and a gNB-CU 307 may sometimes be referred to a gNB 307 (without the "CU" label).

A gNB-DU 302 may terminate the radio interface and associated lower level radio interface protocols to UEs 105 and may transmit DL signals to UEs 105 and receive UL signals from UEs 105, which may include encoding and modulation of transmitted signals and demodulation and decoding of received signals. A gNB-DU 302 may support and terminate Radio Link Control (RLC), Medium Access Control (MAC) and Physical (PHY) protocol layers for the NR Radio Frequency (RF) interface to UEs 105, as defined in 3GPP TSs 38.201, 38.202, 38.211, 38.212, 38.213, 38.214, 38.215, 38.321 and 38.322. The operation of a gNB-DU 302 is partly controlled by the associated gNB-CU 307. One gNB-DU 307 may support one or more NR satellite cells for UEs 105. A gNB-CU 307 may support and terminate a Radio Resource Control (RRC) protocol, Packet Data Convergence Protocol (PDCP) and Service Data Adaptation Protocol (SDAP) for the NR RF interface to UEs 105, as defined in 3GPP TSs 38.331, 38.323, and 37.324, respectively. An gNB-CU 307 may also be split into separate control plane (gNB-CU-CP) and user plane (gNB-CU-UP) portions, where a gNB-CU-CP communicates with one or more AMFs 122 in one more 5GCNs 110 using the NGAP protocol and where a gNB-CU-UP communicates with one or more UPFs 130 in one more 5GCNs 110 using a General Packet Radio System (GPRS) tunneling protocol (GTP) user plane protocol (GTP-U) as defined in 3GPP TS 29.281. An gNB-DU 302 and gNB-CU 307 may communicate over an F1 interface to (a) support control plane signaling for a UE 105 using Internet Protocol (IP), Stream Control Transmission Protocol (SCTP) and F1 Application Protocol (FLAP) protocols, and (b) to support user plane data transfer for a UE using IP, User Datagram Protocol (UDP), PDCP, SDAP, GTP-U and NR User Plane Protocol (NRUPP) protocols.

A gNB-CU 307 may communicate with one or more other gNB-CUs 307 and/or with one more other terrestrial gNBs using terrestrial links to support an Xn interface between any pair of gNB-CUs 302 and/or between any gNB-CU 307 and any terrestrial gNB.

A gNB-DU 302 together with a gNB-CU 307 may: (i) support signaling connections and voice and data bearers to UEs 105; (ii) support handover of UEs 105 between different satellite cells for the same gNB-DU 302 and between different gNB-DUs 302; and (iii) assist in the handover (or transfer) of SVs 302 between different Earth stations 104, different 5GCNs 110, and between different countries. A gNB-CU 307 may hide or obscure specific aspects of SVs 302 from a 5GCN 110, e.g. by interfacing to a 5GCN 110 in the same way or in a similar way to a terrestrial gNB. The gNB-CUs 307 may further assist in sharing of SVs 302 over multiple countries.

In communication system 300, the gNB-DUs 302 that communicate with and are accessible from any gNB-CU 307 will change over time with LEO SVs 302. With the split gNB architecture, a 5GCN 110 may connect to fixed gNB-CUs 307 which do not change over time and which may reduce difficulty with paging of a UE 105. For example, a 5GCN 110 may not need to know which SV/gNB-DUs 302 are needed for paging a UE 105. The network architecture with regenerative SVs 302 with a split gNB architecture may thereby reduce 5GCN 110 impact at the expense of additional impact to a gNB-CU 307.

Support of regenerative SVs 302 with a split gNB architecture as shown in FIG. 3 may impact the communication system 300 as follows. The impact to 5GCN 110 may be limited as for transparent SVs 102 discussed above. For example, the 5GCN 110 may treat a satellite RAT in communication system 300 as a new type of terrestrial RAT with longer delay, reduced bandwidth and higher error rate. The impact on SV/gNB-DUs 302 may be less than the impact on SV/gNBs 202 (with non-split architecture), as discussed above in reference to FIG. 2. The SV/gNB-DU 302 may need to manage changing association with different (fixed) gNB-CUs 307. Further, an SV/gNB-DU 302 may need to manage satellite beams and satellite cells. The gNB-CU 307 impacts may be similar to gNB 106 impacts for a network architecture with transparent SVs 102, as discussed above, except for impacts to support satellite cells and satellite beams which may be to gNB-DUs 302.

For support of satellite access using LTE, NB-IOT or eMTC, regenerative SVs 302 with a split architecture for the satellite NodeBs could also be used. However, unlike the split architecture for a terrestrial gNB that supports 5G NR, no split architecture may be defined for a terrestrial ng-eNB or a terrestrial eNB. However, a split architecture may be possible, in principle, using CUs and DUs that perform analogous functions to gNB-CUs and gNB-DUs for either a terrestrial ng-eNB or a terrestrial eNB. In that case, a gNB-CU 307 shown in FIG. 3 could be replaced by either a CU for an ng-eNB 114, shown as ng-eNB-CU 308 in FIG. 3, or a CU for an eNB (not shown in FIG. 3), and a gNB-DU 302 in an SV 302 could be replaced by a DU for an ng-eNB 114 or an eNB. In this case, a reference to a gNB-DU 302 herein could refer to a DU for an ng-eNB 114 or eNB, a reference to a gNB 307 or a gNB-CU 307 herein could refer to an ng-eNB-CU 308 or a CU for an eNB, and a reference to an SV 302 could refer to an SV with onboard functionality for a DU for an ng-eNB 114 or eNB.

There are several SVOs currently operating and several additional SVOs that are preparing to begin operations that may be capable of supporting satellite access using 5G NR or some other wireless access type such as CDMA. Various SVOs may employ different numbers of LEO SVs and Earth gateways and may use different technologies. For example, currently operating SVOs include SVOs using transparent ("bent pipe") LEO SVs with CDMA, and regenerative LEO SVs capable of ISL. New SVOs have been recently announced with plans for large constellations of LEO SVs to support fixed Internet access. These various SVOs are widely known to the industry.

While supporting satellite access to a wireless network, an SV 102/202/302 may transmit satellite beams (also referred to as "radio beams" or just as "beams") over multiple countries. For example, a beam transmitted by an SV 102/202/302 may overlap two or more countries. Sharing a beam over two or more countries, however, may raise complications. For example, if a beam is shared by two or more countries, earth stations 104 and gNBs 106/202/302/307 in one country may need to support UE 105 access from other countries. Sharing a beam over multiple countries may raise security issues for privacy if both data and voice. Further, sharing an SV beam over multiple countries may raise regulatory conflicts. For example, regulatory services including WEA, LI, and EM calls in a first country could need support from gNBs 106/202/307 and earth stations 104 in a second country that shares the same SV beam.

One solution to complications raised by beam sharing amongst multiple countries is to assign one beam to one country. A possible exception to the assignment of one beam to one country may be made for small nearby countries. The assignment of a beam to a single country additionally implies assigning each satellite cell to one country.

Figure 4:
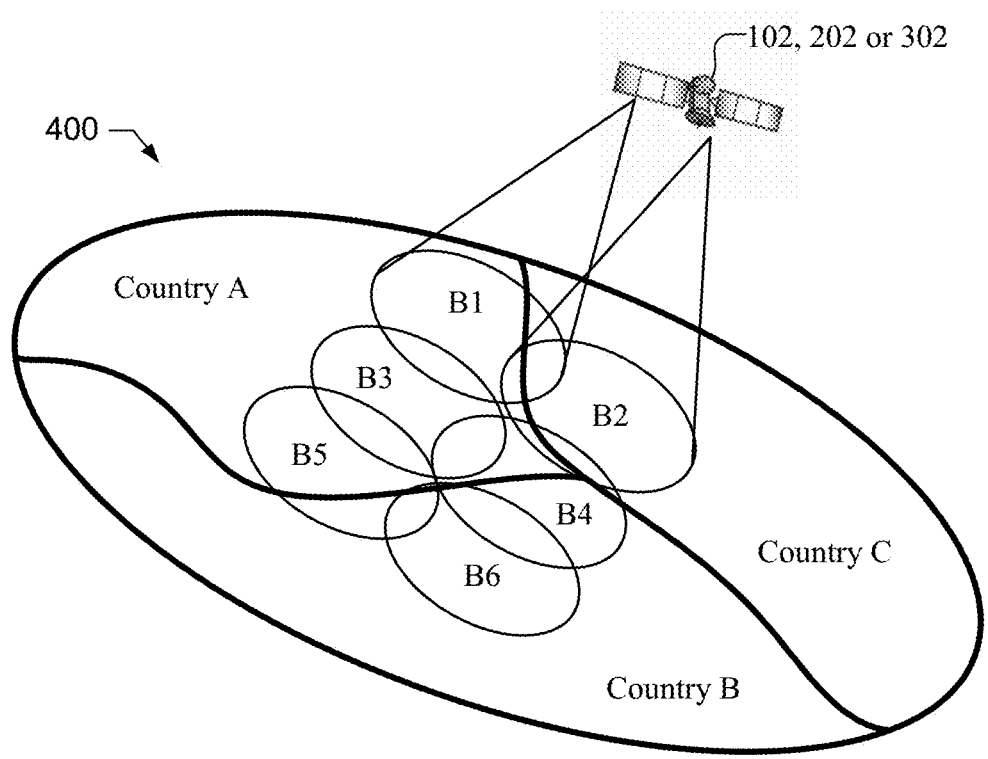
FIG. 4 illustrates a SV generating multiple beams over an area that includes multiple countries.

FIG. 4, by way of example, illustrates an SV 102, 202, 302 generating multiple beams identified as beams B1, B2, B3, B4, B5, and B6 over an area 400 that includes portions of multiple countries, e.g., country A, country B, and country C. With the assignment of each beam to just one country, beams B1, B3, B5 are assigned to country A, beams B4 and B6 are assigned to country B, and beam B2 is assigned to country C.

In one implementation, an individual beam may be assigned to a single country by controlling or steering the beam. While a Non-Geostationary Earth Orbiting (NGEO) SV has a moving coverage area, a relative beam direction may be moved via a controllable antenna array to stay, or mostly stay, within one country, which is sometimes referred to as a "steerable beam". For example, beam coverage may move slowly within one country and then hop to a new country, e.g., after an SV 102, 202, 302 has transferred to a new earth station 104 or new gNB 106 or 307.

In another implementation, a satellite cell and satellite beam may be allowed to support access by different UEs 105 in two or more countries at the same time. For example, beam B1 may support access from UEs 105 in countries A and C, and beams B4 and B5 may support access from UEs 105 in countries A and B. In such cases, it may be important for the support of regulatory services if a gNB 106/202/307 and/or an AMF 122 can determine the country in which a UE 105 is located.

Figure 5:
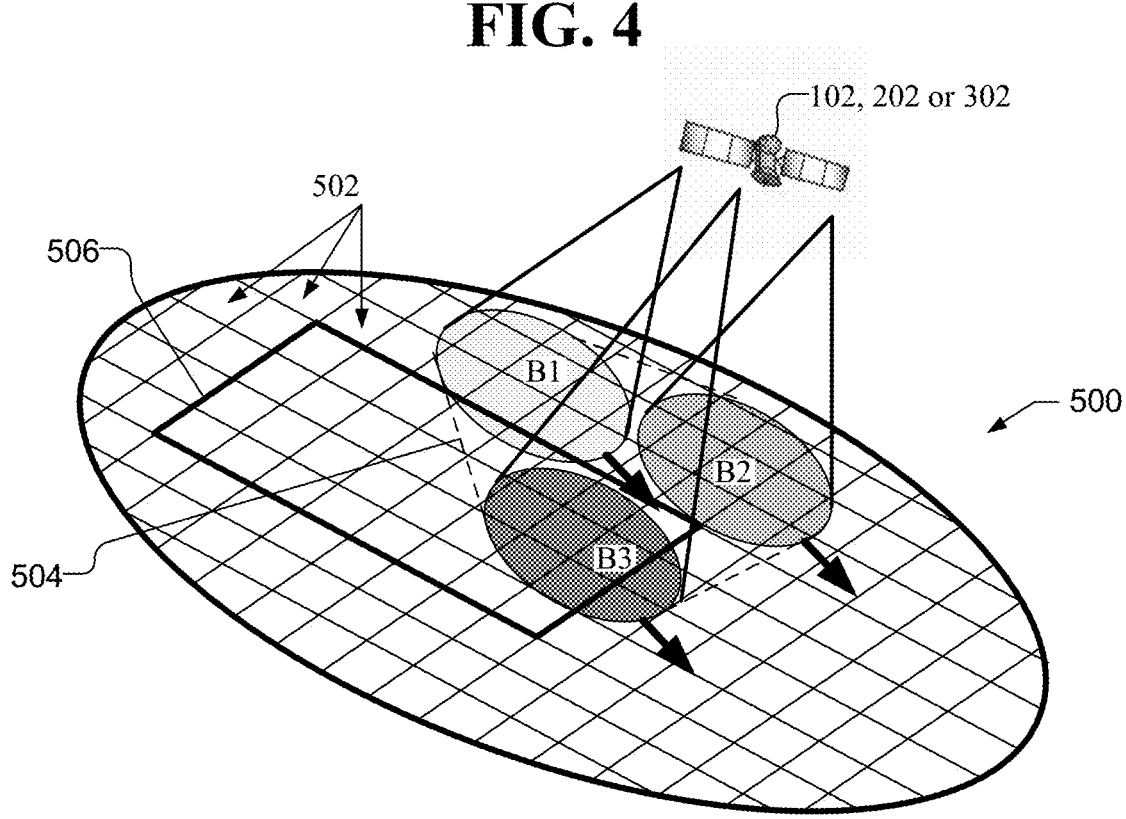
FIG. 5 illustrates satellite cells produced by an SV over an area that includes a number of fixed cells.

FIG. 5 illustrates satellite cells produced by an SV 102, 202, 302 over an area 500 that includes a number of Earth fixed cells 502. A satellite cell may comprise a single beam or multiple beams, e.g., all beams in a satellite cell may use the same frequency or a satellite cell may comprise one beam for each frequency in a set of different frequencies. For example, beams B1, B2 and B3 may support three separate satellite cells (one beam per satellite cell) or may collectively support a single satellite cell (e.g., satellite cell 504 shown with dotted lines). Preferably, a satellite cell covers a contiguous area.

Satellite beams and satellite cells produced by an SV 102, 202, 302 may not align with cells used by terrestrial wireless networks, e.g., 5GCN 110 terrestrial cells or LTE terrestrial cells. For example, in an urban area, a satellite beam or satellite cell produced by an SV 102, 202, 302 may overlap with many 5GCN fixed terrestrial cells. When supporting satellite access to a wireless network, information regarding satellite beams and satellite cells produced by an SV 102, 202, 302 may be hidden from (e.g. not configured in or provided to) a 5GCN 110.

As illustrated in FIG. 5, an area 500 may include a number of Earth fixed cells 502, as well as fixed tracking areas (TAs) such as TA 506. Fixed cells are not "real cells," e.g., as used for terrestrial NR and LTE access, and may be referred to as "virtual cells" or "geographic cells." A fixed cell, such as fixed cells 502, has a fixed geographic coverage area, which may be defined by a PLMN operator. For example, the coverage area of a fixed cell or a fixed TA may comprise the interior of a circle, ellipse or a polygon. The coverage area is fixed relative to the surface of the Earth and does not change with time, unlike the coverage area of a satellite cell which typically changes with time for a LEO or MEO SV. A fixed cell 502 may be treated by a 5GCN 110 the same as a real cell that supports terrestrial NR access. Groups of fixed cells 502 may define a fixed TA 506, which may be treated by a 5GCN the same as TAs that are defined for terrestrial NR access. Fixed cells and fixed TAs used for 5G satellite wireless access may be used by a 5GCN 110 to support mobility management and regulatory services for UEs 105 with minimal new impact.

With regenerative SVs 202 with a non-split architecture as in communication systems 200, each satellite cell may remain with the same SV 202 and may have a moving coverage area supporting different 5GCNs 110 at different times.

With transparent SVs 102 and regenerative SVs 302 for a split architecture as in communication system 300, each satellite cell may be assigned to and controlled by one gNB 106 or 307 on behalf of one or more PLMNs in one country. For a GEO SV 102/302, the assignment to a gNB 106/307 may be permanent or temporary. For example, the assignment may change on a daily basis to allow for peak traffic occurrence at different times in different parts of the SV 102/302 radio footprint and/or may change over a longer period to accommodate changing regional traffic demands. For a non-geostationary (NGEO) SV 102/302, the assignment might last for a short time, e.g., only 5-15 minutes. A non-permanent satellite cell may then be transferred to a new gNB 106/307 as necessary (e.g. when access to the NGEO SV 102/302 is transferred to the new gNB 106/307). Each gNB 106/307, for example, may have a fixed geographic coverage area, e.g., comprising a plurality of fixed cells 502 and fixed TAs. A satellite cell for a first NGEO SV 102/302 may be transferred from a first gNB 106/307 to a second gNB 106/307 when (or after) moving into the fixed coverage area of the second gNB 106/307. Prior to this transfer, UEs 105 accessing the satellite cell in a connected state may be moved to a new satellite cell for the first gNB 106/307 or could be handed off to the second gNB 106/307 as part of transferring the satellite cell. An SV 102/302 may be accessed from only one gNB 106/307 or from multiple gNBs 106/307, possibly in different countries. In one implementation, an SV 102/302 may be assigned to multiple gNBs 106/307 by partitioning satellite cells produced by the SV 102/302 among the different gNBs 106/307. Satellite cells may then be transferred to new gNBs 106/307 (and to new countries) as the SV 102/302 moves or as traffic demands change. Such an implementation would be a form of a soft handoff in which SV 102/302 transfer from one gNB 106/307 to another gNB 106/307 occurs in increments of satellite cells and not all at once.

Figure 6:
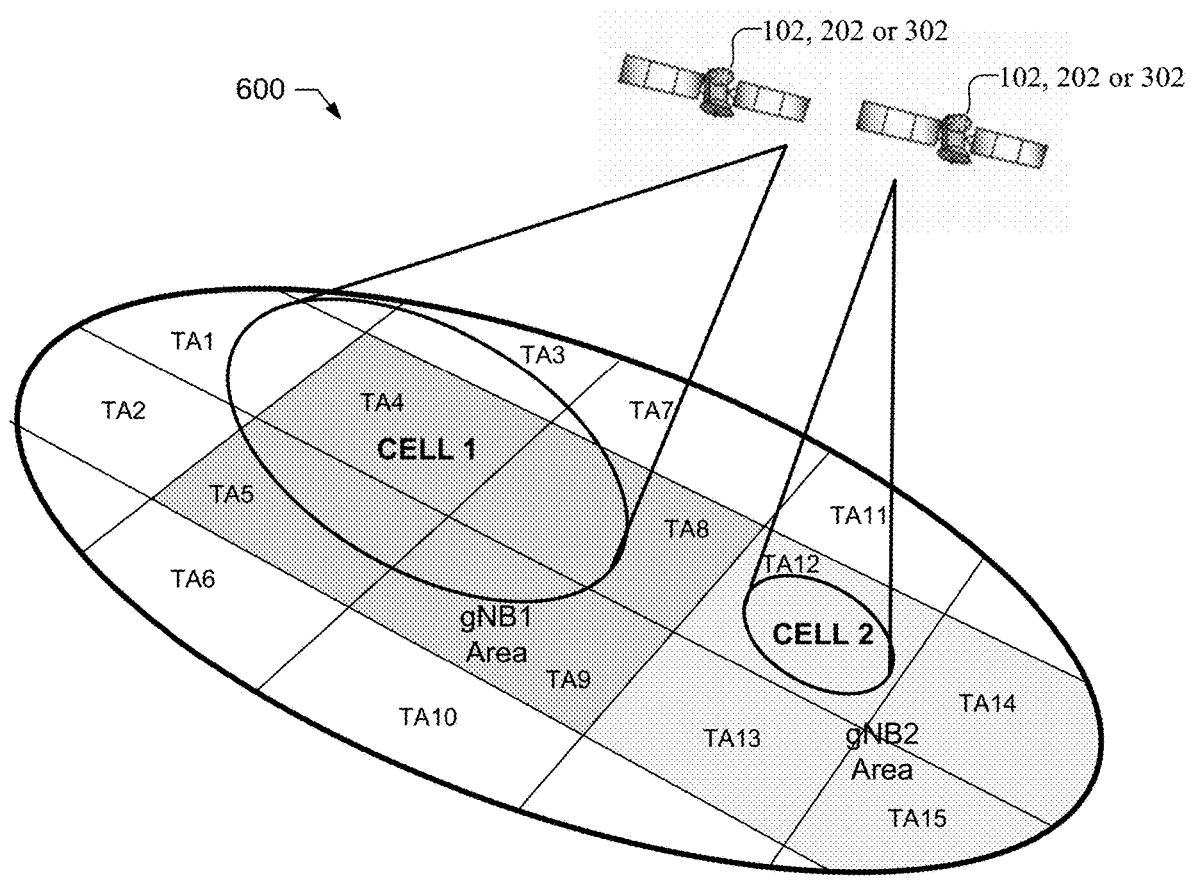
FIG. 6 illustrates an assignment of satellite cells produced by an SV to fixed tracking areas (TAs).

FIG. 6 shows an example of assignment of satellite cells, e.g., cell 1 and cell 2, produced by one or more SVs 102, 202, 302 over an area 600. As illustrated, the area 600 includes a number of fixed TAs, e.g., TA1-TA15, wherein TA4, TA5, TA8, and TA9 are assigned to a gNB1 (which may be a gNB 106, gNB 202 or a gNB 307), and TA12, TA13, TA14, and TA15 are assigned to a gNB2 (which may be another gNB 106, 202 or 307). In one implementation, a satellite cell may be considered to support a fixed TA if the satellite cell is wholly within the TA (e.g., Cell 2 within TA 12); if the TA is wholly within the satellite cell (e.g., TA4 within Cell 1); or if the overlap of the coverage area of a satellite cell and a TA exceeds a predetermined threshold fraction of the total coverage area of the satellite cell or the total area of the TA (e.g., cell 1 overlap with TA1, TA3, TA5, TA8 or TA9). An SV 102, 202, 302 may broadcast, e.g., in a System Information Block type 1 (SIB1) or SIB type 2 (SIB2), the identities (IDs) of supported PLMNs (e.g., where a PLMN ID comprises a Mobile Country Code (MCC) and Mobile Network Code (MNC)) and, for each supported PLMN, the IDs of supported TAs (e.g. where the ID of TA comprises a Tracking Area Code (TAC)). For an NGEO SV, the supported PLMNs and TAs may change as satellite cell coverage areas change. An gNB 106/202/307 may determine PLMN and TA support (and thus the PLMN IDs and TACs which are broadcast in a SIB for each satellite cell) from known ephemeris data for each SV 102/202/302 and a known directionality and angular range for component satellite beams for each satellite cell (e.g. Cell 1 and Cell 2). A gNB 106/202/307 may then update SIB broadcasting.

Thus, as illustrated in FIG. 6, an SV 102/202/302 may broadcast for cell 1 a SIB that includes TACs for TA4 and possibly TA1, TA3, TA5, TA8 and/or TA9. Similarly, the SV 102/202/302 or another SV 102/202/302 may broadcast for Cell 2 a SIB that includes a TAC for TA12 only. The Cell 1 may be assigned to gNB1 (which has coverage of TA4, TA5, TA8, and TA9) and Cell 2 may be assigned to gNB2 (which has coverage of TA12, TA13, TA14, and TA15). Cell 1 and Cell 2 may be transferred from gNB1 to gNB2 or from gNB2 to gNB1 if the cell coverage area moves from one gNB area to another.

The coverage area for a fixed TA may be defined in a manner that is simple, precise, flexible and requires minimal signaling for conveyance to a UE 105 or gNB 106/202/307, or an entity in a 5GCN 110. A fixed TA area may be small enough to allow efficient paging by comprising an area supported by just a few satellite cells (e.g. less than 10) and may also be large enough to avoid excessive UE registration (e.g. may extend at least several kilometers in any direction). The shape of a fixed TA area may be arbitrary, e.g., the shape may be defined by a PLMN operator, or may have one or more restrictions. For example, one restriction for the shape of the fixed TA area may be that a fixed TA along the border of a country precisely aligns with the border to avoid serving UEs 105 in another country. Additionally, a fixed TA may be restricted to align with an area of interest, e.g., a PSAP serving area, the area of a large campus, etc. Additionally, a fixed TA may be restricted so that parts of the fixed TA align with a physical obstacle, such as the bank of a river or lake.

The coverage area for fixed cells may likewise be defined in a manner that is simple, precise, flexible and requires minimal signaling for conveyance to a UE 105 or gNB 106/202/307. A fixed cell coverage area may allow for simple and precise association with a fixed TA, e.g., one fixed cell may belong unambiguously to one fixed TA.

As mentioned earlier, a possible problem with 5G satellite access concerns power expenditure from a UE 105 when selecting a new satellite cell. For a UE 105 using discontinuous reception (DRX), power saving mode (PSM) or where there are satellite coverage gaps or where the UE 105 is powered off by a user, the UE 105 may enter an inactive state where the UE 105 is either unable to access a satellite 102/202/302 (e.g. if powered off or where there is a satellite coverage gap) or where the UE 105 is configured (e.g. for DRX or PSM) to not access a satellite 102/202/302. When the inactive state ends (e.g. if the UE 105 is powered on again by a user, if a satellite 102/202/302 becomes available again after a coverage gap or if a configured period of DRX or PSM comes to an end), the UE 105 may need to find a suitable satellite 102/202/302 and an associated satellite cell in order to access a wireless network (e.g. access a 5GCN 110) and return to a CONNECTED state in which the UE 105 can access a remote entity. However, finding and accessing a suitable satellite cell from a cold start, where any information for previously used satellite cells may no longer be valid, may require the expenditure of significant power and energy by a UE 105 in order to search possible satellite cell frequencies including trying different Doppler frequency shifts to allow for motion of a satellite 102/202/302 towards or away from the UE 105.

A number of factors may make finding and accessing a satellite cell more difficult and power intensive for a UE 105 than finding and accessing a cell for a terrestrial wireless network. These factors may include: (i) irrelevance of cell information for the time when the UE 105 was last in a CONNECTED state; (ii) lower power DL signals received by the UE 105 from a satellite 102/202/302 than from a terrestrial base station (e.g. terrestrial gNB) which would make DL signal reception more difficult; (iii) Doppler shift for DL signals received from a satellite 102/202/302 due to satellite 102/202/302 motion which could increase or reduce the frequency received by a UE 105 in an unpredictable manner and require a UE 105 to perform a combined frequency and Doppler search for satellite cells; and (iv) coverage gaps where no satellite 102/202/302 and associated satellite cells are visible to a UE 105 for some period unknown to the UE 105. In addition, for an IOT UE 105, it is possible that a UE 105 would remain in a CONNECTED state with a 5GCN 110 for only a short period (e.g. 5-30 seconds) in order to complete one transaction or a few transactions with a remote entity (e.g. in order to send a status or information report to, and/or receive new instructions from, the remote entity). It could then be preferable for the IOT UE 105 to acquire and use one satellite cell for the entire period of the transaction(s) and avoid handover of the IOT UE 105 to another satellite cell which might increase power and energy use to perform the handover. This objective could require that an IOT UE 105 is able to find and access a satellite cell whose remaining coverage lifetime at the location of the IOT UE 105 exceeds the duration of the transaction(s). This objective may not be achieved if the IOT UE 105 randomly selects a satellite cell available at the current IOT UE 105 location as some satellite cells (e.g. for LEO and MEO SVs) may have a coverage lifetime that is less than the duration of the transaction(s). It may further be beneficial if a UE 105 can find and access a satellite cell with low latency in order to reduce any delay in accessing and preforming one or more transactions with a remote entity or setting up a data or voice session with a remote party or entity.

One solution to support the above objectives would be to provide a UE 105 with extra information, referred to here as "acquisition information", to enable the UE 105 to find and access an optimum cell with low energy and power expenditure and with low latency. An optimum cell could have the following properties: (i) long availability at the current UE 105 location (e.g. more than one minute) to avoid handover of the UE 105; (ii) minimum distance of the associated satellite 102/202/302 to the UE 105 via a minimum elevation angle and/or minimum distance to the satellite 102/202/302 orbital plane to maximize UL/DL signal strength for the UE 105; and (iii) use of a preferred frequency (for optimum satellite 102/202/302 and UE 105 signal propagation). If N satellite cells are potentially available to a UE 105 (e.g. where N may be a number between 3 and 20 in scenarios where several or many satellite cells are available), a random search might find and select one of the N satellite cells but it might not be optimum. A smart search could find one of only a few optimum satellite cells with lower power expenditure to perform the search and to access the cell subsequently.

Figure 7:
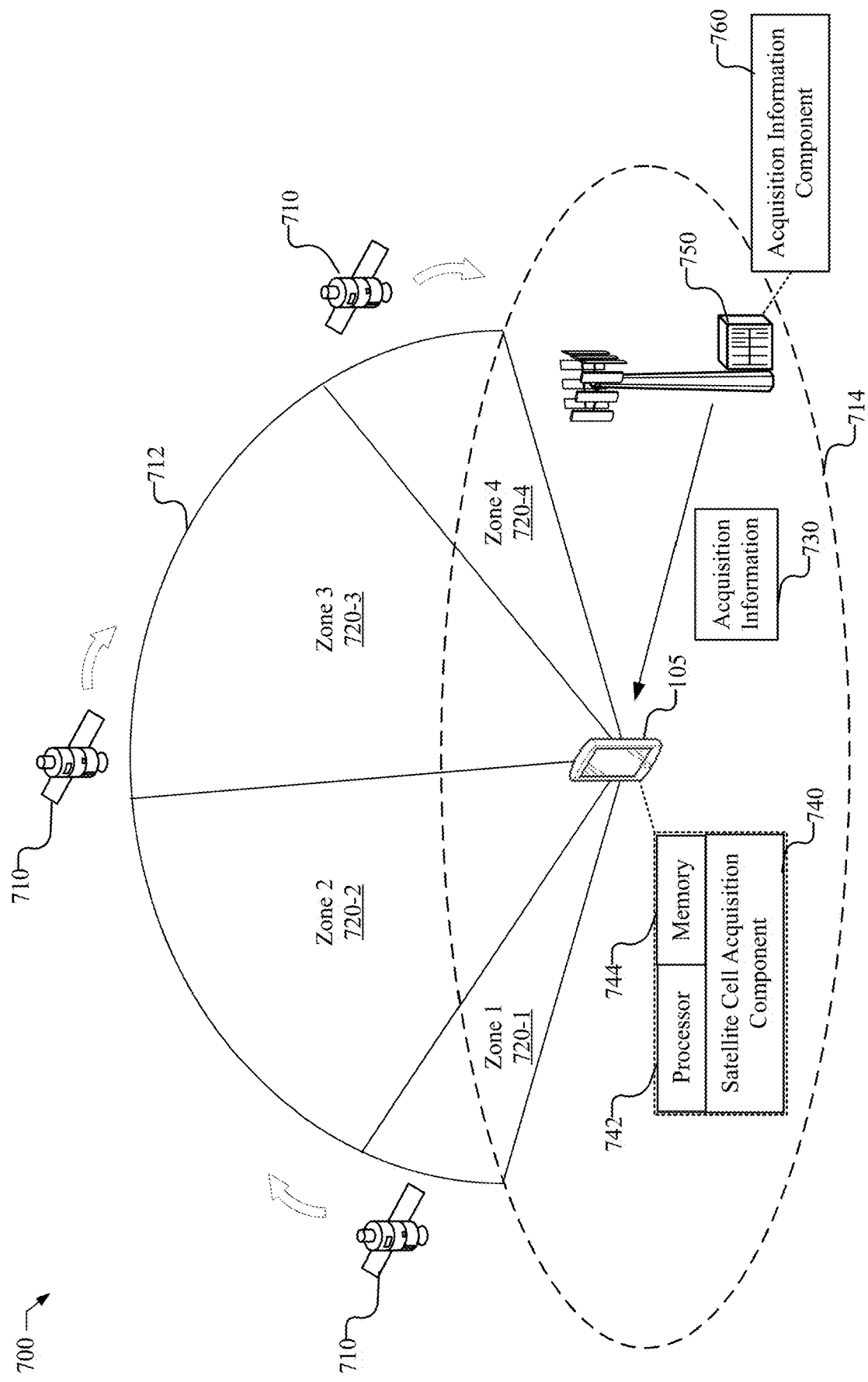
FIG. 7 shows a diagram of a user equipment (UE) receiving acquisition information for selecting a cell provided by an SV.

FIG. 7 shows a diagram 700 of a UE 105 receiving acquisition information 730 for selecting a satellite cell provided by an SV 102/202/302. The UE 105 may receive the acquisition information 730 from an entity 750, which may be a gNB 106/202/307 providing access to a serving PLMN (e.g. a 5GCN 110), an AMF (e.g., AMF 122) in the serving PLMN, a server in the serving PLMN (e.g. an SLP 132), an Operations & Maintenance server for the serving PLMN (not shown in FIGS. 1-3), or a server for an original equipment manufacturer (OEM). The acquisition information 730 may be received via a satellite 102/202/302 at some previous time by the UE 105 (e.g. before the UE 105 enters and later leaves an inactive state and before the satellite 710 shown in FIG. 7 becomes visible to the UE 105). As discussed in further detail below, the acquisition information 730 may include information for identifying and/or accessing a satellite cell supported by a communication satellite 710. The UE 105 may include a satellite cell acquisition component 740 that is configured to receive the acquisition information 730, find and/or select a satellite cell based on the acquisition information 730 (e.g., after leaving an inactive state), and access the satellite cell based on the acquisition information 730. In some implementations, the satellite cell acquisition component 740 may include executable instructions stored on a memory 744 that are executable by a processor 742. The entity 750 may include an acquisition information component 760 that is configured to provide the acquisition information 730. In some implementations, the acquisition information component 760 may include executable instructions stored on a memory that are executable by a processor.

In an aspect, due to the dynamic nature of satellite cells, some satellite cells and/or SVs (e.g., communication satellites) may be preferable (e.g. more suitable) for satellite wireless access by a UE. For example, an SV 710, which may be any of an SV 102, 202 or 302 and is here assumed to be non-GEO, may travel along an orbital path 712 as shown in FIG. 7 (e.g. in a clockwise direction as shown by the arrows in FIG. 7). A view of the SV 710 from the UE 105 may be restricted by a horizon 714. Further, an azimuth angle and/or elevation angle of the SV 710 at the location of the UE 105 may affect a quality of a satellite cell for wireless access. For instance, the orbital path 712 may be divided into a plurality of zones with different characteristics. In a first zone 720-1 (also referred to as "zone 1"), the SV 710 may be near the horizon 714 from the perspective of UE 105 (e.g., an elevation angle may be less than a threshold minimum such as 10 degrees). A remaining visibility of the SV 710 in the first zone 720-1 may be relatively good (e.g., longer than in other zones), but the low elevation and relatively long range may result in relatively poor signal quality and/or possible signal blockage by intervening objects such as buildings or hills while the SV 710 remains in the zone 720-1. In a second zone 720-2 (also referred to as "zone 2"), the angle of elevation for the SV 710 may be greater than the threshold minimum and the SV 710 may be ascending in elevation (e.g., less than an apex). In an aspect, the second zone 720-2 may be preferred for both initial access and ongoing access to the SV 710 because of relatively low range, high elevation, and long remaining visibility. In a third zone 720-3 (also referred to as "zone 4"), the SV 710 may be near to or past an apex and the angle of elevation may be decreasing but remain above the threshold minimum. The third zone 720-3 may be preferred for ongoing access due to the relatively low range and high elevation; however, the third zone 720-3 may not be preferred for initial access as a remaining duration of visibility for the SV 710 may be less than in the second zone 720-2. In a fourth zone 720-4 (also referred to as "zone 4"), the SV 710 may have an angle of elevation less than the threshold minimum and the SV 710 may be moving toward the horizon 714. Accordingly, the fourth zone 720-4 may not be preferred for access to the SV 710.

In an aspect, the preference for satellite cells may also depend on a type of satellite cell, e.g., whether the satellite cell is temporarily fixed using a steerable antenna on the SV 710 or is continuously moving as the SV 710 moves using a fixed antenna on the SV 710. A temporarily fixed satellite cell from the SV 710 in zone 720-2 may be preferred because the cell may remain fixed while the SV 710 is in zone 720-2 and zone 720-3. A moving satellite cell from SV 710 in zone 720-2 may be less preferred though still preferred to a moving satellite cell from the SV 710 when in zone 720-3. Although a moving satellite cell may provide similar signal quality to a temporarily fixed satellite cell, the UE 105 may need to hand off or reselect to another moving cell for the same SV 710 or another SV when the SV 710 moves further along the orbital path 712 (e.g. moves from zone 720-2 to zone 720-3).

In an aspect, a satellite cell may be selected by the UE 105 based on characteristics of the satellite cell that are either acceptable or better than corresponding characteristics for other satellite cells that are available at the location of the UE 105 (e.g., satellite cells supported by SVs in other zones). Example characteristics that can be acceptable or better include: (i) a lower range (i.e. shorter distance) from the UE 105 to the communication satellite that provides the satellite cell than from the UE 105 to communication satellites providing the other satellite cells; (ii) an angle of elevation from the UE to the communication satellite that provides the satellite cell exceeding a threshold minimum; (iii) a longer time of availability for the satellite cell at the location of the UE 105 than for the other satellite cells; (iv) a longer time of visibility for the communication satellite that provides the satellite cell at the location of the UE 105 than for the communication satellites providing the other satellite cells; or (v) support of a tracking area (TA) by the satellite cell for a serving PLMN for the UE 105 that is part of a registration area for the UE 105 or is an allowed tracking area for the UE 105.

Because of the preferences applicable to satellite cells, a random cell search may often provide a non-preferred or unsuitable cell. Further, a cell search may consume power and/or time to locate a preferred or suitable cell. In an aspect, the present disclosure provides acquisition information 730 to the UE 105 to reduce cell search time and/or power consumed. The acquisition information 730 may also result in selection of a preferred or higher quality cell and improve communication characteristics such as channel quality, throughput, or latency.

Figure 8:
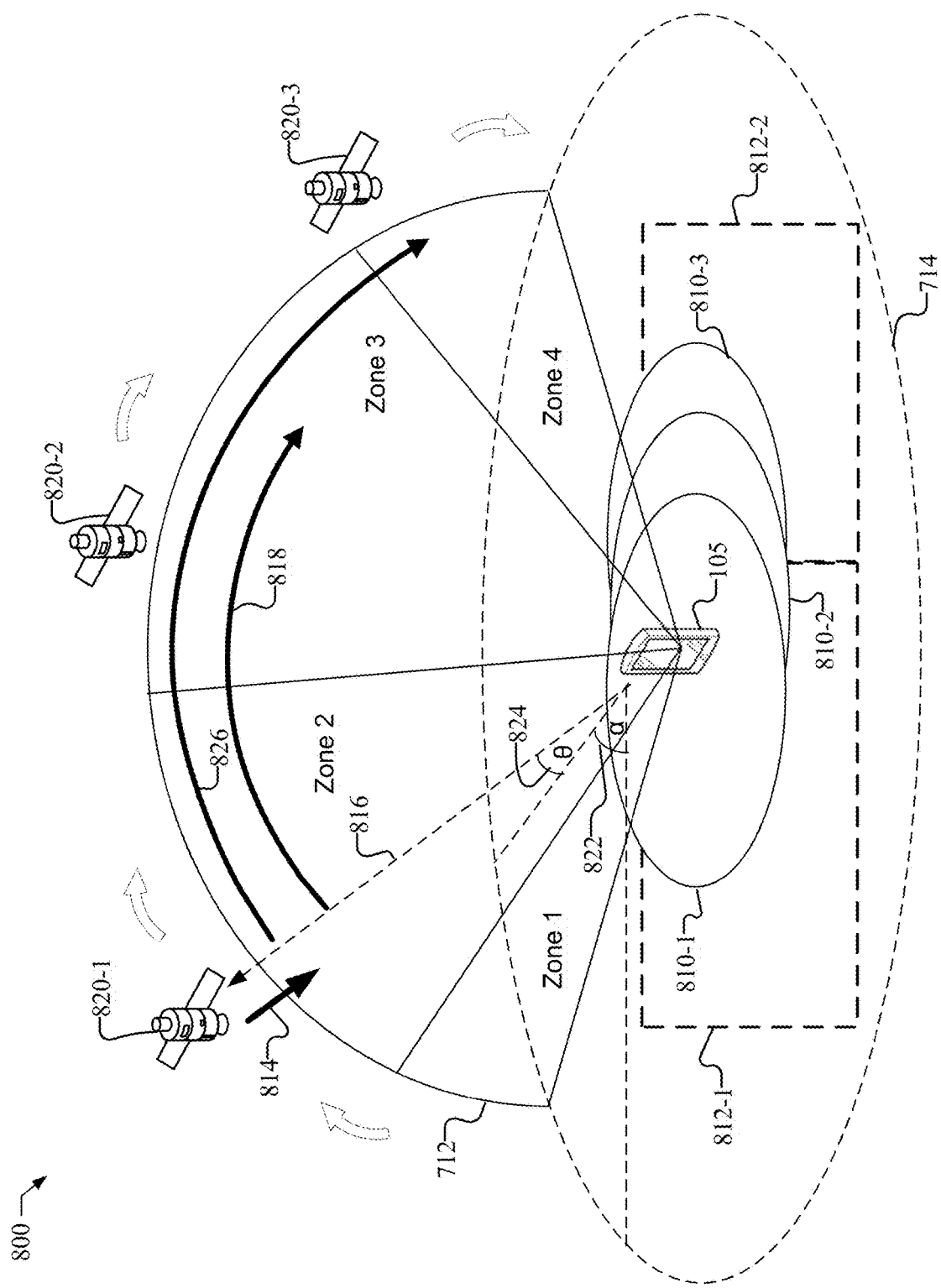
FIG. 8 shows a diagram of characteristics of cells provided by an SV.

FIG. 8 shows a diagram 800 of characteristics of satellite cells 810 (e.g., cells 810-1, 810-2, and 810-3) provided by SVs 820 (here assumed to be non-GEO) travelling along the orbital path 712 described for FIG. 7. The SVs 820 may correspond to different examples of SV 710 in FIG. 7 and may each be an SV 102, 202 or 302 from FIGS. 1-3. In FIG. 8, the SVs 820 are assumed to be different SVs, travelling along the same orbital path but at different positions for this orbital path, and available to a UE 105 at a same time (e.g. when the UE 105 needs to find and access a cell in order to obtain wireless access to a 5GCN 110). The common orbital path 712 is purely for illustration and the SVs 820 might instead have different orbital paths. Furthermore, each of SVs 820 could provide more than one cell 810 available at the same time at the location of UE 105.

In FIG. 8, SV 820-1 is assumed to provide cell 810-1, SV 820-2 is assumed to provide cell 810-2 and SV 820-3 is assumed to provide cell 810-3. All three cells 810-1, 810-2 and 810-3 are assumed to be available to the UE 105 at the same time in the sense that the coverage area of each of the cells 810-1, 810-2 and 810-3 includes a current location for UE 105. Thus, in FIG. 8, while the depicted cell 810-1 is shown obscuring parts of the coverages areas of cells 810-2 and 810-3 and while the depicted cell 810-2 is shown obscuring part of the coverage area of cell 810-3 in FIG. 8, all three cells include UE 105 in their coverage areas.

Each cell 810 may be either a temporarily fixed cell or a moving cell, as described earlier. For example, an SV 820 with a steerable antenna may support a temporarily fixed cell 810 by steering a beam toward some geographic area as the SV 820 travels along the orbital path 712. For instance, the SV 820-1 may support the cell 810-1 while in the second zone and the third zone shown in FIG. 8, where the coverage area of the cell 810-1 remains almost fixed and includes the location of UE 105. In contrast, an SV 820 with a fixed antenna may support a moving cell 810 as the transmitted beam covers different areas as the SV 820 travels along the orbital path 712. For example, the SV 820-2 may support the cell 810-2 while in zone 3, where the cell 810-2 moves to no longer provide coverage to the UE 105 when the SV 820-2 moves into zone 4.

The acquisition information 730 provided to the UE 105 can provide information for satellite cells available to the UE 105 at a single known location for the UE 105, or at different possible locations of the UE 105 if the location of the UE 105 is unknown or not reliably known, and for one or more times. The acquisition information 730 can include a number of characteristics that are illustrated in FIG. 8 for the cell 810-1 provided by SV 820-1 but can apply equally well to cells 810-2 and 810-3 provided by SVs 820-2 and 820-3. One characteristic is a Doppler shift 814 which can indicate a relative increase or decrease in a transmission frequency of an SV 820 received at a particular UE 105 location (or at different possible UE 105 locations) and is caused by a relative radial motion of the SV 820 towards or away from the UE 105. Knowledge of a Doppler shift 814 by the UE 105 can enable the UE 105 to more accurately tune RF reception of signals for the cell 810-1 and more rapidly acquire the cell 810-1. Another characteristic is a range 816 denoting a distance to SV 820-1 at a particular UE 105 location. The range 816 can enable the UE 105 to estimate a signal strength for the SV 820-1 and/or determine a transmission timing offset if not separately provided in the acquisition information 730 for the cell 810-1. An angle of elevation θ 824 (also referred to as an elevation) can indicate a direction to the SV 820-1 in a vertical plane, and an angle of azimuth α 822 (also referred to as an azimuth) can indicate a direction to the SV 820-1 in a horizontal plane (e.g. relative to a known direction such as due North). Knowledge of the elevation 824 and azimuth 822 may enable a UE 105 to configure a directional antenna of the UE 105 to more easily acquire signals for the cell 810-1 and transmit signals to the SV 820-1 providing the cell 810-1. Knowledge of the elevation 824 and azimuth 822 may also allow a UE 105 that is aware of intervening objects that may block a line of sight (LOS) path to the satellite 820-1 to determine whether or not there will be a LOS path to the satellite 820-1. For example, a UE 105 that is attached to an outside wall of a building and used for surveillance or monitoring and is configured with information on suitable LOS directions for SVs 820 can use the azimuth 822 and elevation 824 information to determine whether the UE 105 will have LOS to the SV 820-1.

Another characteristic can be one or more parameters describing or defining the orbital path 712 as seen as a particular location of the UE 105. For example, these parameters may include an azimuth angle for a point on horizon 714 where orbital path 712 starts to become visible to UE 105, azimuth and elevation angles for an apex of orbital path 712, and an azimuth angle for a point on horizon 714 where orbital path 712 ceases to be visible to UE 105. Knowledge of the elevation 824 and azimuth 822 and the parameters for the orbital path 712 can enable a UE 105 to determine how suitable is the current location of the SV 820-1 (e.g. whether it is in zone 1, 2, 3 or 4 described for FIG. 7). A further characteristic is a duration (or time) of visibility 826 of SV 820-1 at a particular location of UE 105 which can correspond to an amount of time for which SV 820-1 will remain visible at a particular location of UE 105 (e.g. for which an elevation of SV 820-1 will exceed a threshold minimum such as 5 or 10 degrees). This characteristic may be useful to indicate to UE 105 a duration of availability of the SV 820-1 with UE 105 possibly handing over to different cells of SV 820-1 while SV 820-1 remains visible. A further characteristic can be a duration of availability 818 of cell 810-1 at a particular location of UE 105 which can correspond to an amount of time for which a particular location of UE 105 remains in a coverage area for the cell 810-1. If the cell 810-1 is moving, the duration of availability 818 may be relatively short (e.g. 20 seconds to 2 minutes) and may be shorter than a duration of availability 818 for a cell 810-1 that is temporarily fixed as described earlier. For a cell 810-1 that is temporarily fixed, the duration of availability 818 could be the same as or almost the same as the duration of visibility 826 of the SV 820-1, as illustrated by the arrow in FIG. 8 which shows a duration of availability 818 coinciding with future positions of the SV 820-1 as it moves along the orbital path 712 (though in the example in FIG. 8, the duration of availability 818 is shown as less than the duration of visibility 826). Typically, the duration of visibility 826 of SV 820-1 will always equal or exceed the duration of availability 818 of the cell 810-1.

A further characteristic can be one or more tracking areas 812 which an SV 820-1 can indicate as being supported by the cell 810-1. For example, in FIG. 8, a gNB (e.g. a gNB 106/202/307 and not shown in FIG. 8) might indicate (e.g. broadcast in a System Information Block (SIB) for cell 810-1) support for TA 812-1 (case A), TA 812-2 (case B) or both TAs 812-1 and 812-2 (case C). A UE 105 might then be allowed to access the cell 810-1 without a registration update if the current registration area for the UE 105 includes TA 812-1 for case A, TA 812-2 for case B or either of TA 812-1 or TA 812-2 for case C. Conversely if TA 812-1 for case A, TA 812-2 for case B or both of TAs 812-1 and 812-2 for case C is/are not allowed or forbidden for UE 105, the UE 105 may not be allowed access to the cell 810-1. Thus inclusion in the acquisition information 730 of the TA or TAs 812 that are supported by the cell 810-1 may assist a UE 105 to know in advance whether access to the cell 810-1 will be allowed and whether the UE 105 may need to first perform a registration update before making use of the cell 810-1 for other communication.

The acquisition information 730 may also define rules which enable a UE 105 to estimate one or more of the above characteristics, e.g. based on other provided characteristics. Acquisition information 730 may also provide other information for each cell 810 such as identification and frequency information. For example, each cell 810 may have a cell global identification (CGI). Each cell 810 may transmit a physical cell identification (PCI), which may be encoded on synchronization signals. Each cell 810 may be associated with an absolute radio frequency channel number (ARFCN) that defines a frequency for the cell. The acquisition information 730 may thus also include information on radio frequencies used in the cell 810-1 such as the ARFCN and may indicate a PCI and/or CGI.

A UE 105 may make use of characteristics, such as those described above, for multiple cells 810 provided in or implied by the acquisition information 730 to determine a particular cell 810 that is more suitable (e.g. is preferred) at the current UE 105 location and for a particular time than others cells 810. For example a more suitable (e.g. preferred) cell 810 may be in a zone 2 (or possibly zone 3), may have a longer duration of availability 818, may have a shorter range 816, may have an angle of elevation 824 exceeding a threshold minimum (e.g. 10 degrees), may have a longer time of visibility 826 for the associated SV 820, and/or may support a tracking area 812 that is part of a registration area for the UE 105 or is not disallowed for the UE 105.

The acquisition information 730 can also allow the UE 105 to access a more suitable cell 810 using lower power or energy and/or with reduced latency, e.g. by: (i) adjusting a UE 105 transmission frequency to match a frequency expected by an SV 820 for the cell 810; (ii) adjusting a UE 105 transmission timing (e.g. based on a range 816) to match a transmission timing expected by the associated SV 820 or by a gNB 106/202/307 linked to the SV 820 that supports the suitable cell 810; (iii) adjusting a UE 105 reception frequency to match a frequency received by the UE 105 from the associated SV 820 (e.g. based on a Doppler shift 814); (iv) adjusting an ARFCN used by the UE 105 for reception of signals for the suitable cell 810 to match an ARFCN used for transmission of signals by the SV 820 for the suitable cell 810; and/or (v) adjusting an angle of elevation, an angle of azimuth or both for an antenna array of the UE 105 to match an angle of elevation 824, an angle of azimuth 822 or both for the SV 820 at a location of the UE 105.

Figure 9:
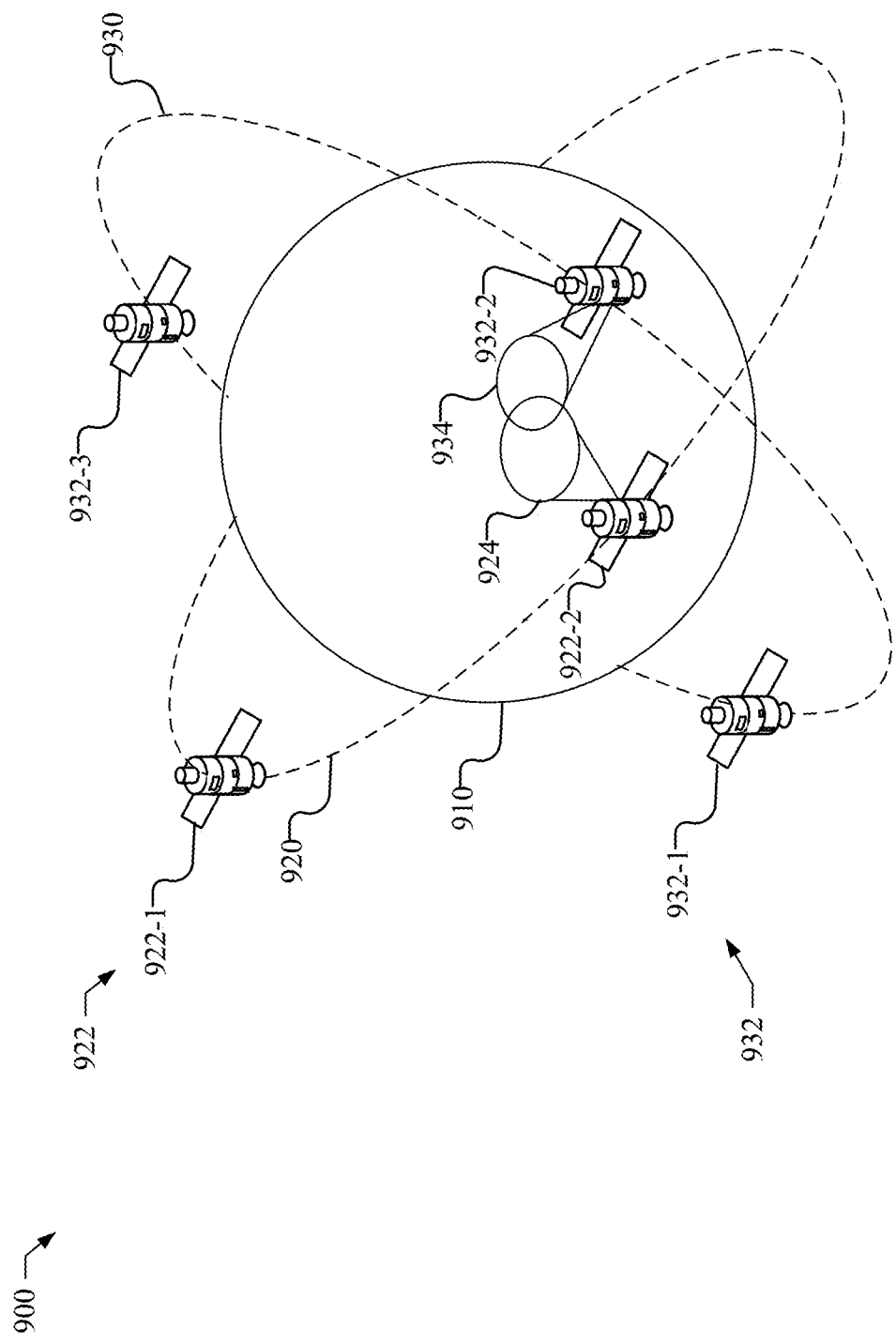
FIG. 9 shows a diagram of example orbital paths for SVs.

FIG. 9 is a diagram 900 illustrating orbital paths 920, 930 for SVs in orbit around the Earth 910. Orbital paths 920 and 930 may be shared by multiple SVs 922 and 932, respectively, which occupy different positions on the orbital paths 920 and 930, respectively, at any given time. Orbital paths 920 and 930 may be defined using Cartesian XYZ coordinates or Spherical coordinates with an origin at the center of the Earth and may remain fixed relative to a hypothetical non-rotating approximation of the Earth's surface such as the World Geodetic System 1984 (WGS84) reference ellipsoid. Orbital paths 920 and 930 may be examples of the orbital path 712 used in FIGS. 7 and 8. An SV 922 (e.g., SV 922-2) may provide a cell at a location 924. Similarly, an SV 932 (e.g. SV 932-2) may provide a cell at a location 934. The location 924 may overlap with the location 934, so a UE 105 may have multiple cells available (e.g. at the same UE 105 location and at the same time) from different SVs on different orbital paths.

It is noted that the term "orbital plane" refers to a 2 dimensional plane that includes an SV orbital path (e.g. 920 or 930) and that thus intersects the surface of the Earth. A UE 105 may lie on an orbital plane or may be at some distance from it. In the latter case, there may be some minimum distance between the UE 105 and the orbital plane along a straight line over the surface of the Earth that may be perpendicular to the orbital plane. Due to rotation of the Earth, a UE 105 location on an orbital plane and distance to an orbital plane may vary with time, though not very significantly with LEO SVs which may only be visible at the location of a UE 105 for around 5 to 15 minutes (or less).

Figure 10:
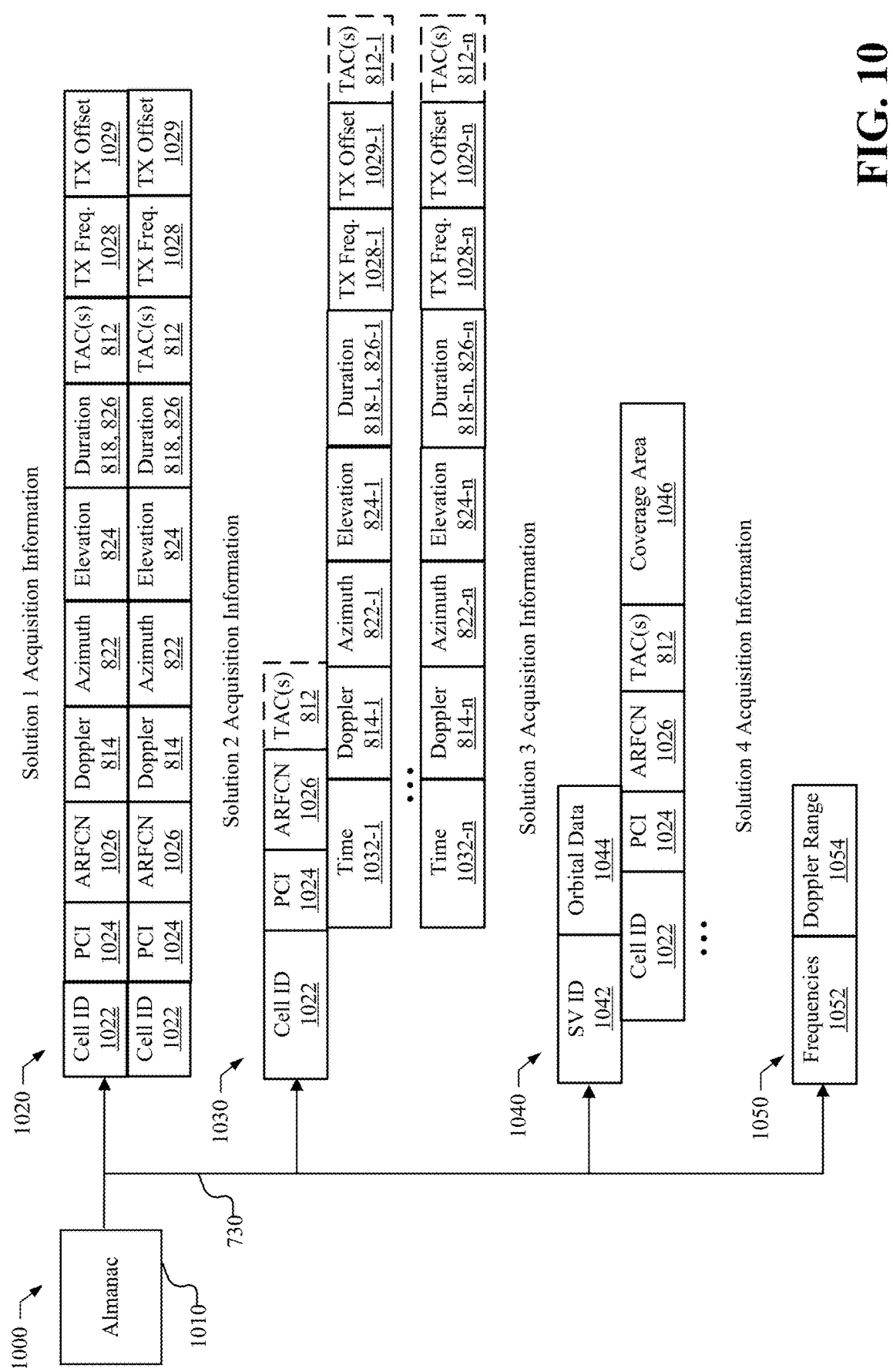
FIG. 10 shows a diagram of various sets of acquisition information.

FIG. 10 is a diagram 1000 showing different sets of acquisition information 730 that may be provided to a UE 105 from an almanac 1010. The almanac 1010 may include information for satellite cells 810 and/or SVs 820. For example, the almanac 1010 may be compiled by a network operator (e.g., of a PLMN) that supports the satellite cells 810 and/or SVs 820 or by an OEM of the UE 105. The entity 750 and/or the acquisition information component 760 may provide a subset of the almanac 1010 in acquisition information 730 to a UE 105 to support the UE 105 finding a satellite cell, in particular, for when the UE 105 leaves an inactive state and accesses a satellite cell. In an aspect, the entity 750 may attempt to reduce the size of the acquisition information 730 to conserve network resources and UE 105 memory.

In an aspect, the acquisition information 730 for a UE 105 to find and access a satellite cell 810 may depend on a time and a location of the UE 105. The entity 750 may provide different acquisition information 730 depending on whether the time and location at which the UE 105 is to access a satellite cell 810 are known in advance. For instance, a known location may correspond to an actual location of the UE 105 being within a maximum distance of a predicted or expected location for the UE 105 for which the acquisition information 730 is provided. The maximum distance may be, for example, 50 kilometers (kms), 20 kms, 10 kms, or 5 kms. Similarly, a known time may be scheduled in advance and may differ from an actual time at which a UE 105 attempts to select and access satellite cell 810 by a maximum amount of, e.g. 10 or 20 seconds. The acquisition information 730 may then be reliable and usable by UE 105 as long as the actual location of the UE 105 and the actual time at which UE 105 attempts to select and access a cell 810 are within the maximum ranges described above. When the actual location of UE 105 and/or the actual time at which UE 105 attempts to select and access a cell 810 are outside the maximum ranges described above, the UE 105 may not always be able to select a most suitable or more suitable cell 810 and/or may not be able to reduce power and/or latency in accessing a selected cell 810.

In a first scenario (referred to here as "Solution 1"), the UE 105 may need to access a satellite cell 810 at a known time and location, as described above. For example, the first scenario may be applicable to a UE located on a farm, forest area, industrial complex, mining area, roadside, or building rooftop, where the UE is generally stationary and has a line of sign to a satellite. For instance, the UE may be associated with a monitoring device that periodically reports measurements on a fixed schedule. The entity 750 may provide the acquisition information 730 as an information set 1020 for satellite and cell availability at the known UE 105 location for each of a number of scheduled times that each correspond to a known time at which the UE 105 may need to access a cell 810. In some implementations, the acquisition information 730 and/or information set 1020 may be filtered (e.g. with information for some cells 810 not being included if these cells 810 are unsuitable for the UE 105) based on limitations of the UE 105 such as supported frequencies and ability to transmit or receive only in certain directions (e.g., due to a fixed antenna or due to LOS limitations for a UE 105 close to or attached to a building). The information set 1020 provided for each scheduled time can include information for one or more preferred cells (e.g. cells 810 which have preferred characteristics as described earlier). The information provided for each cell 810 may include one or more of a cell global identification 1022; a PCI 1024; an ARFCN 1026; a Doppler frequency shift 814 for reception of signals by the UE; an azimuth angle 822, an elevation angle 824 or both at the known UE 105 location of an SV 820 providing the cell 810; a duration 818 of satellite cell availability at the known location of the UE 105; a duration of visibility 826 of an SV 820 providing the cell 810 at the known location of the UE 105; supported TACs 812; a UE transmission frequency offset 1028; or a UE transmission timing offset 1029.

In a second scenario (referred to here as "Solution 2"), the actual location of the UE 105 is known in advance to within a maximum distance (as for Solution 1), but the time or times at which the UE 105 may need to select and access a cell 810 are not known. For example, a sensor may be located at a fixed known location and transmit data at unpredictable times whenever some event is detected. The entity 750 may provide the acquisition information 730 as an information set 1030 of satellite and cell availability at the known UE location for a sequence of periodic times 1032 at fixed intervals. For example, the fixed intervals may be one minute intervals (e.g. the periodic times may then be 12:00 pm, 12:01 pm, 12:02 pm, 12:03 pm, 12:04 pm etc. in some known time zone or according to UTC etc.). For a cell 810 supported by a GEO SV, all of the information for a cell 810 may remain the same over time, which may mean that Solution 2 is not needed or can be used with just one or a few periodic times. For a non-GEO SV 820 (e.g. LEO or MEO), only some of the information for a cell 810 (referred to here as static information) such as the Cell ID 1022, PCI 1024, ARFCN 1026, and possibly the TAC(s) 812 may remain the same over time. Other information may vary over time. The information set 1030 may thus include the same information as information set 1020 (e.g. information for preferred cells 810 available at the known UE 105 location) for static information. The information set 1030 may further include variable characteristics for each periodic time 1032-1, 1032-2, 1032-3, to 1032-n. The variable characteristics can include: Doppler shift 814-1-814-n; the azimuth 822-1-822-n; the elevation 824-1-824-n; the duration 818-1-818-n of satellite cell availability at the known location of the UE 105; the duration 826-1-826-n of visibility of an SV 820 at the cell 810 at the known location of the UE 105; the TX frequency 1028-1-1028-n, the TX offset 1029-1-1029-n, and possibly TACs 812-1 to 812-n (e.g. if the TACs 812 are not part of the static information). For instance, each of the durations 818-1-818-n and the durations 826-1-826-n may be a remaining duration at each periodic time 1032.

In some implementations, a UE 105 may need to select and access a cell 810 at a time that is between a periodic time 1032-2 and an immediately following periodic time 1032-3 or an immediately preceding periodic time 1032-1. The information set 1030 may include information for determining at least one variable characteristic for any time that is between one of the periodic times and an immediately following periodic time or an immediately preceding periodic time. In some implementations, the values in the information set 1030 may indicate a change over a previous half interval and a next half interval. For example, the information set 1030 may include a first (and optionally second) order rate of change for a variable characteristic that is a real or rational number, or values of a variable characteristic at the start of a previous half interval and at the end of a next half interval. The UE 105 may determine at least one variable characteristic for any time that is between one of the periodic times and an immediately following periodic time or an immediately preceding periodic time. For instance, the UE 105 may determine the at least one variable characteristic (e.g. if a real or rational number) based on one or more of: interpolation of the at least one variable characteristic between the periodic time and the immediately following periodic time or the immediately preceding periodic time; information for a first order rate of change for the at least one variable characteristic; or information for a second order rate of change for the at least one variable characteristic. For example, the UE 105 may determine the at least one variable characteristic when the UE 105 leaves an inactive state (e.g. and needs to select and access a cell 810) at a time that is between a periodic time and an immediately following periodic time or an immediately preceding periodic time.

In a third scenario (referred to here as "Solution 3"), the location of a UE 105 and the times at which the UE 105 may need to select and access a satellite cell 810 are not known in advance. The entity 750 may then provide the acquisition information 730 as an information set 1040 that includes almanac information on satellite orbits and cells supported by each satellite. The acquisition information may include at least one of: orbital data for communications satellites 820 supporting a plurality of satellite cells 810; an identification of satellite cells in the plurality of satellite cells 810 supported by each of the communication satellites 820; for each of the plurality of satellite cells 810, an indication of at least one of a cell global ID, a physical cell ID, an ARFCN, a duration of the satellite cell including a start time and stop time, supported tracking area codes and start and stop times, or a coverage area of the satellite cell; or some combination thereof. The information set 1040 may enable the UE 105 to determine which cells are available at a time and location when the UE leaves an inactive state (e.g. and then needs to select and access a cell 810). For instance, the information set 1040 may include an SV ID 1042 for an SV 922 or 932, and orbital data 1044 for the SV 922 or 932. In an implementation, the orbital data 1044 may define an orbital path such as the orbital path 920 or 930. If there are multiple SVs 922 or 932, the orbital data 1044 may include a reference to the same orbital path and a timing difference between the SVs 922 or 932 on the same orbital path. The information set 1040 may include a cell ID (e.g. CGI) 1022, a PCI 1024, an ARFCN 1026, TAC(s) 812, and a coverage area 1046 for each cell provided by each SV 922 or 932. In an example, the coverage area 1046 may be described as a geographic area plus timing information. For a temporarily fixed cell 810 (e.g., using a steerable beam) the timing information may include a start time and stop time for the geographic area. For a moving cell 810, the timing information may include a start time for the geographic area and a velocity of the cell 810. In another example, the coverage area 1046 may be described as cell beams with beam information indicating a direction of transmission, angular width, and whether antennas are fixed or steerable.

In a fourth scenario (referred to here as "Solution 4"), the location of the UE 105 and the times at which the UE 105 may need to select and access a satellite cell 810 are not known in advance. The entity 750 may provide the acquisition information 730 as an information set 1050 that allows the UE 105 to filter cells based on frequency and/or timing information such as information on Doppler frequency shifts. Referring back to FIG. 8, the Doppler shift 814 for an SV 820 may vary according to the location and velocity of the SV 820 relative to the UE 105. The radial velocity of the SV 820 may be towards the UE 105 when the SV is in zone 1 and zone 2 which can result in a positive Doppler shift 814 (where the frequency of transmissions received from SV 820 at UE 105 is increased). However, after the SV 820 enters zone 3 and passes the apex of the orbital path 712 as seen by the UE 105, the radial velocity of the SV 820 may be away from the UE 105 which can result in a negative Doppler shift 814 (where the frequency of transmissions received from SV 820 at UE 105 is reduced). The information set 1050 may thus include a Doppler Range 1054 which includes a range of values for a positive Doppler Shift 814 that correspond to Doppler Shifts 814 produced by an SV 820 in zone 2 for various SV 820 orbital planes with some maximum perpendicular distance to the location of the UE 105. The Doppler Range 1054 may be determined for an arbitrary UE 105 location and allowing for all possible orbital planes that are within a maximum perpendicular distance of the arbitrary UE 105 location. By searching for a cell 810 for an SV 820 with a Doppler shift 814 within the Doppler Range 1054, a UE 105 may increase the probability of finding a cell for an SV 820 that is in the preferred zone 2 and whose range 816 to the UE 105 can be less than some maximum threshold due to limiting the maximum perpendicular distance of the UE 105 to the orbital plane of the SV 820. In an aspect, the information set 1050 may further provide an available set of cell frequencies 1052 (e.g., ARFCNs). The information set 1050 may be provided for all satellite cells supported for a serving PLMN by communication satellites 820 that, at any location in a coverage area of the serving PLMN, have a threshold minimum elevation 824, a threshold minimum duration of satellite visibility 826 and a threshold maximum range 816. In some implementations, either the entity 750 or the UE 105 may calculate the acquisition information 730 in the information set 1050. A UE 105 may use the available set of cell frequencies 1052 and the Doppler Range 1054 to perform a combined frequency and Doppler search for a suitable cell 810.

Figure 11:
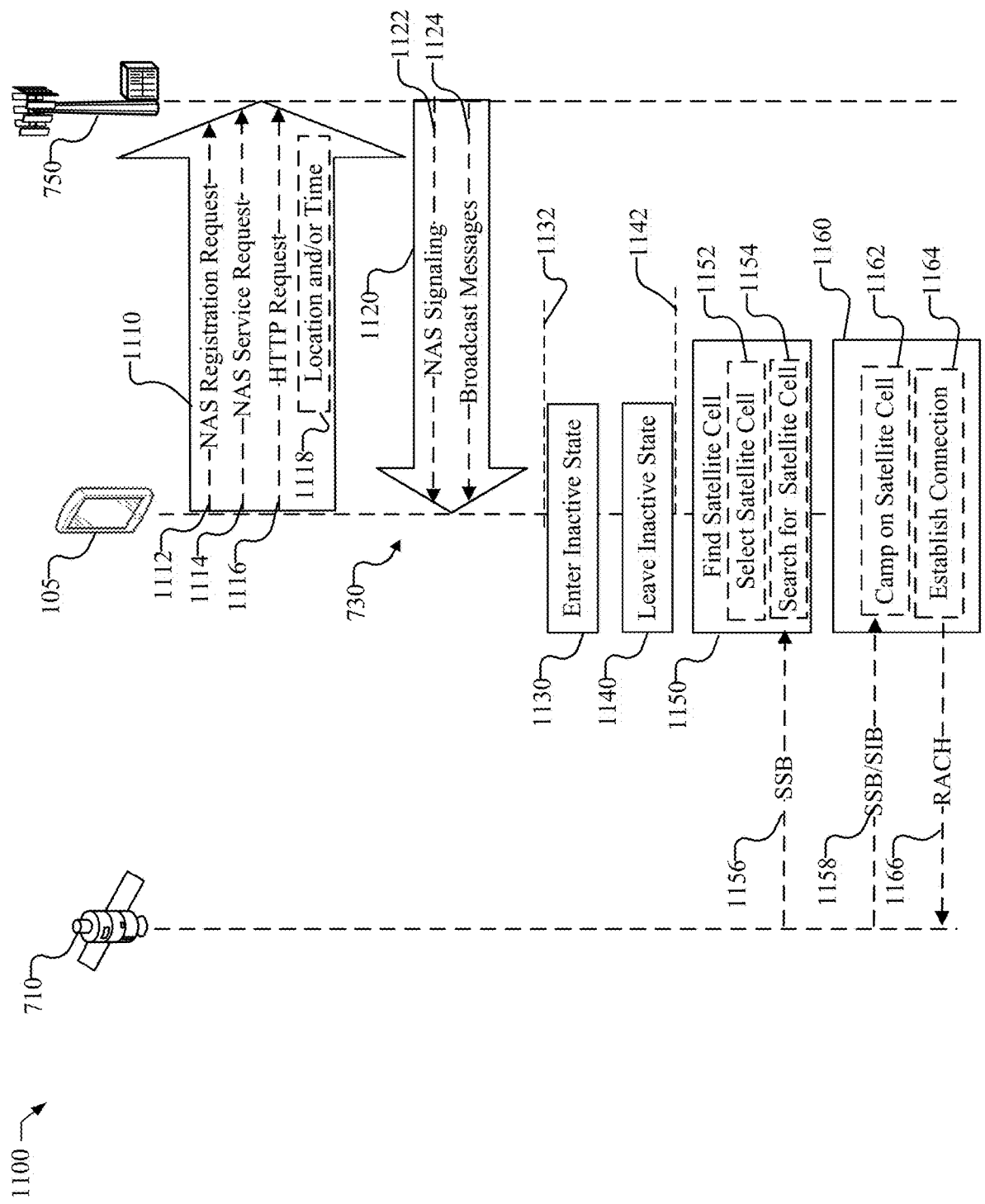
FIG. 11 is a message diagram illustrating communications for acquiring a cell provided by an SV.

FIG. 11 is a message diagram 1100 illustrating communications for a UE 105 acquiring a cell provided by an SV 710. The UE 105 may communicate with an entity 750 to obtain acquisition information 730. For example, the UE 105 may transmit a request 1110 to the entity 750. For instance, where the entity 750 is an AMF 122, the UE 105 may transmit a NAS registration request 1112 or a NAS service request 1114 to the entity 750. The UE request 1110 may optionally include a location and/or time(s) 1118 at which the UE 105 will leave an inactive state and/or will need to find and access a cell 810. The location may be known by the UE 105, for example, if the UE 105 has a fixed location or if the UE 105 is constrained to move within a certain known area (e.g. on a farm or within a city, campus or building complex). The time(s) may be similarly known by the UE 105—e.g. if the UE 105 is configured to interact with an external client or server at a certain predefined time or times. In some implementations where the entity 750 is a server, the UE request 1110 may be an HTTP request 1116 carried via IP packets.

The entity 750 may transmit the acquisition information 730 to the UE 105 as signaling 1120. The acquisition information 730 may comprise one or more of the information sets 1020, 1030, 1040 and 1050 described for FIG. 10 and/or may include any of the acquisition information described for FIGS. 7 and 8. Where the entity 750 is the AMF 122, the signaling 1120 may be in response to the NAS registration request 1112 or the NAS service request 1114. For example, the signaling 1120 may be NAS signaling 1122. In some implementations, where the entity 750 is a gNB 106/202/307, the UE 105 may receive one or more broadcast messages 1124 from the gNB 106/202/307, where the one or more broadcast messages include the acquisition information 730. In these implementations, the request 1110 may not always be sent. As discussed above, the acquisition information 730 may include one of the information sets 1020, 1030, 1040, or 1050, which can depend on whether the location and time of the UE 105 are known (e.g. depending on whether the location and/or time(s) 1118 were included in the request 1110).

At block 1130, the UE 105 may enter an inactive state. The inactive state may correspond to at least one of: (i) a power saving mode (PSM) where UE 105 conserves power by not engaging in signaling; a discontinuous reception (DRX) during which UE 105 and a serving 5GCN 110 cease signaling to one another; a satellite coverage gap where no SV 820 or no cell 810 are available or accessible at the location of the UE 105; or a user invoked power off state for the UE 105. During the inactive state, the UE 105 may not have radio access, and thus may not receive signals from or transmit signals to an SV 820 and may cease accessing any cell 810.

At block 1140, the UE 105 may leave the inactive state, e.g. in order to resume access to a serving PLMN. The inactive state may start at a first time 1132 and end at a second time 1142 later than the first time 1132. For example, the power saving mode, the discontinuous reception, the satellite coverage gap, or the power off state may start at the first time 1132 and end at the second time 1142.

At block 1150, the UE 105 may find a satellite cell from a plurality of satellite cells identified in the acquisition information 730—e.g. a plurality of cells 810 indicated in information set 1020 or information set 1030. For example, the block 1150 may include, at sub-block 1152, selecting the satellite cell from satellite cells available at the second time in the plurality of satellite cells. The UE 105 may select the satellite cell based on characteristics of the satellite cell that are either acceptable or better than corresponding characteristics for other satellite cells in the satellite cells available at the second time. For example, this may correspond to selecting a satellite cell that is preferable to or more suitable than other satellite cells in the satellite cells available at the second time 1142 as described for FIGS. 7 and 8. In some implementations, at sub-block 1154, finding the satellite cell may include searching for and/or acquiring the satellite cell. For instance, the UE 105 may scan for and receive a synchronization signal block (SSB) 1156 from the satellite cell. The SSB 1156 may include a primary synchronization signal (PSS), a secondary synchronization signal (SSS), and a physical broadcast channel (PBCH). The UE 105 may receive the SSB 1156 on a frequency, with a Doppler shift and/or indicating a particular Physical Cell ID (PCI), as indicated by the acquisition information 730. For example, the UE 105 may perform a scan for an SSB of the selected cell based on an ARFCN 1026 or frequency 1052, a Doppler 814 or Doppler Range 1054, and/or a PCI 1024 indicated for the selected cell in the acquisition information 730.

At block 1160, the UE 105 may access the SV 710 that provides the selected satellite cell using the satellite cell. The accessing may be based on the acquisition information 730. For example, at sub-block 1162, the UE 105 may camp on the satellite cell. Camping may include receiving and decoding information 1158 broadcast by SV 710 or by a gNB 106/202/307 via SV 710 in the satellite cell such as one or more additional SSBs transmitted for the satellite cell and/or one or more system information blocks (SIBs) for the satellite cell. As another example, at sub-block 1164, the UE 105 may establish a connection to a serving PLMN (e.g. a 5GCN 110) using the satellite cell and the SV 710. For instance, the UE 105 may transmit a random access channel (RACH) message 1166 via the SV 710 to a gNB 106/202/307 (not shown in FIG. 11) that supports the satellite cell to start to establish the connection with the serving PLMN. Additional Radio Resource Control (RRC) messages (not shown in FIG. 11) may then be exchanged between the UE 105 and the gNB 106/202/307 to complete the establishment of the connection with the serving PLMN.

In some implementations, accessing the SV 710 using the satellite cell at block 1160 may include using the acquisition information 730 to perform at least one of: (i) adjusting a UE 105 transmission frequency to match a frequency (e.g. indicated in the acquisition information 730) expected by the SV 710; (ii) adjusting a UE 105 transmission timing to match a transmission timing expected by the SV 710 (e.g. as indicated by a transmission timing offset 1029 in the acquisition information 730); (iii) adjusting a UE 105 reception frequency to match a frequency received by the UE 105 from the SV 710 (e.g. as indicated by a Doppler 814 or Doppler Range 1054 in the acquisition information 730); (iv) adjusting an ARFCN used by the UE 105 for reception of signals for the satellite cell from the SV 710 to match an ARFCN used for transmission of signals by the SV 710 for the satellite cell (e.g. as indicated by an ARFCN 1026 or Frequency 1052 in the acquisition information 730); and/or (v) adjusting an angle of elevation, an angle of azimuth or both for an antenna array of the UE 105 to match an angle of elevation, an angle of azimuth, or both for the SV 710 at the location of the UE (e.g. as indicated by an elevation 824, an azimuth 822 or both in the acquisition information 730).

Figure 12:
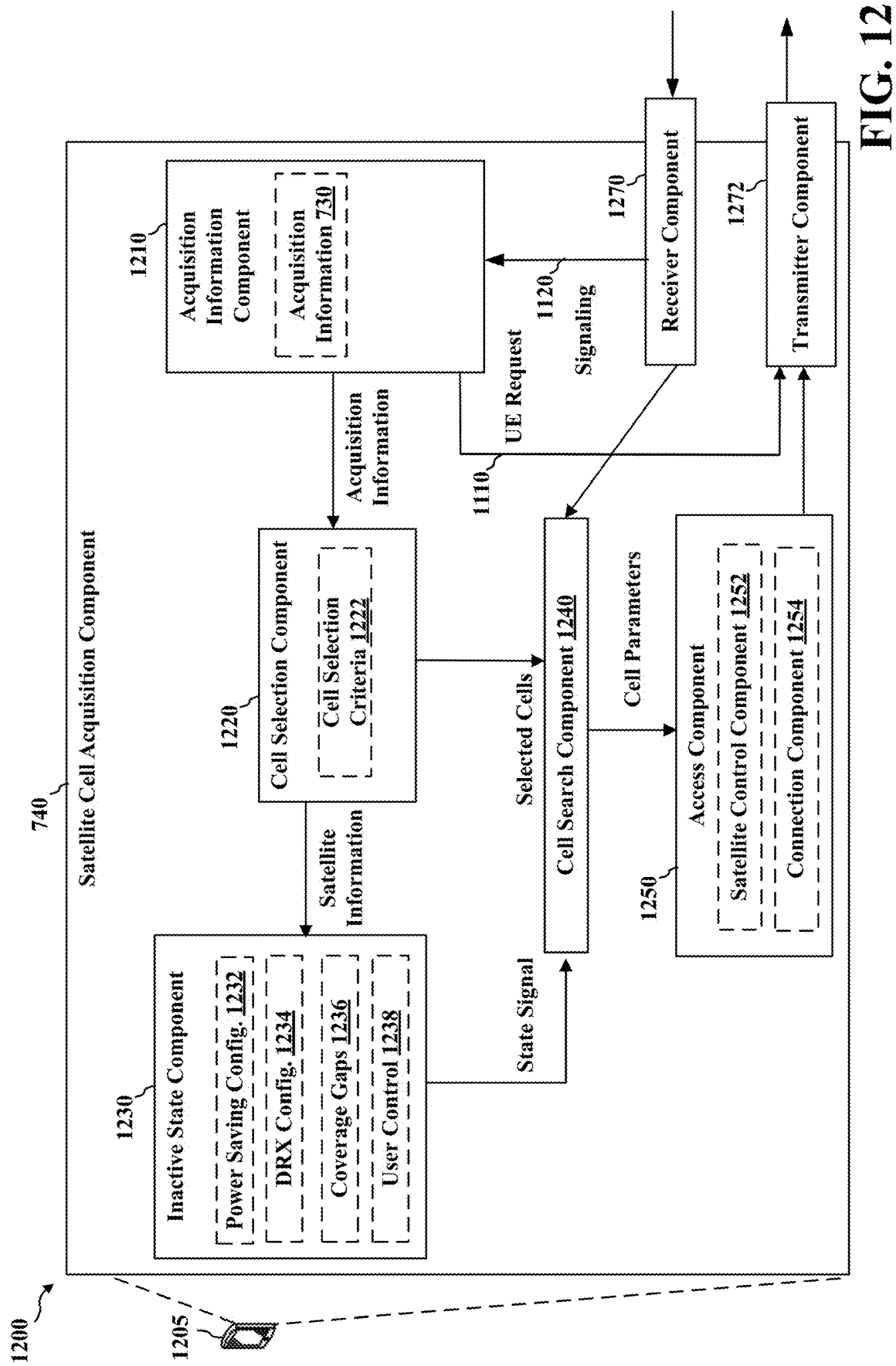
FIG. 12 is a data flow diagram illustrating components of an example UE.

FIG. 12 is a data flow diagram 1200 illustrating the data flow between different means/components in an example UE 1205, which may be an example of the UE 105 and includes the satellite cell acquisition component 740.

The UE 1205 may include the satellite cell acquisition component 740, a receiver component 1270, and a transmitter component 1272. The receiver component 1270 may include, for example, a radio-frequency (RF) receiver for receiving the signals described herein (e.g. signals transmitted by an SV 102/202/302/710/820). The transmitter component 1272 may include for example, an RF transmitter for transmitting the signals described herein (e.g. signals transmitted to an SV 102/202/302/710/820). In an aspect, the receiver component 1270 and the transmitter component 1272 may be co-located in a transceiver.

The satellite cell acquisition component 740 may include, for example, an acquisition information component 1210, a cell selection component 1220, an inactive state component 1230, a cell search component 1240, and an access component 1250.

The acquisition information component 1210 may be configured to obtain, from an entity 750, acquisition information 730 for a plurality of satellite cells supporting access to a serving PLMN. In some implementations, the acquisition information component 1210 may be configured to transmit the UE request 1110 to the entity 750 via the transmitter component 1272. The acquisition information component 1210 may be configured to receive the signaling 1120 via the receiver component 1270. The acquisition information component 1210 may be configured to extract the acquisition information 730 and/or an information set 1020, 1030, 1040, or 1050 from the signaling 1120. The acquisition information component 1210 may be configured to locally store the acquisition information 730. In some implementations, the acquisition information component 1210 may be preconfigured (e.g., by an OEM) with the acquisition information 730. The acquisition information component 1210 may provide the acquisition information 730 to the cell selection component 1220.

The cell selection component 1220 may receive the acquisition information 730 from the acquisition information component 1210. The cell selection component 1220 may be configured with cell selection criteria 1222. In a first example (e.g. which may be applicable to Solution 1 and Solution 2 described for FIG. 10), the cell selection criteria 1222 may determine a preferable or a more suitable satellite cell from among a plurality of satellite cells indicated or identified in the acquisition information 730. For example, the cell selection criteria 1222 may determine a satellite cell that has characteristics that are either acceptable or better than corresponding characteristics for other satellite cells in the satellite cells available at the second time described for block 1140 for FIG. 11. For example, the characteristics may include one or more of a lower range from the UE 1205 to a communication satellite for the satellite cell than from the UE 1205 to communication satellites providing the other satellite cells in the satellite cells available at the second time; an angle of elevation from the UE 1205 to the communication satellite for the satellite cell that exceeds a threshold minimum; a longer time of availability for the satellite cell at a location of the UE 1205 than for the other satellite cells in the satellite cells available at the second time; a longer time of visibility for the communication satellite for the satellite cell at the location of the UE 1205 than for the communication satellites providing the other satellite cells available at the second time; or support of a tracking area for the serving PLMN that is part of a registration area for the UE 1205 (e.g. where a registration area may comprise tracking areas that the UE 1205 is allowed to access without performing a new registration with the serving PLMN). The cell selection component 1220 may use weights to select a cell when multiple characteristics are applicable.

In a second example (e.g. which may apply to Solution 1, Solution 2, Solution 3 or Solution 4 described for FIG. 10), the cell selection criteria 1222 may identify a threshold minimum angle of elevation, a threshold minimum period of visibility and a threshold maximum range. The acquisition information 730 may identify some or all satellite cells provided for the serving PLMN by communication satellites. The cell selection component 1220 may identify cells that, at any location in a coverage area of the serving PLMN, have a threshold minimum angle of elevation, a threshold minimum period of visibility and a threshold maximum range based on the cell selection criteria 1222. The cell selection component 1220 may provide a set of selected cells to the access component 1250. The cell selection component 1220 may provide satellite information to the inactive state component 1230.

The inactive state component 1230 may be configured to place the UE 1205 into an inactive state and to later remove the UE 1205 from the inactive state. The inactive state may correspond to at least one of a power saving mode, a discontinuous reception (DRX), a satellite coverage gap, or to a user invoked power off state for the UE 1205. The inactive state component 1230 may determine whether to enter or leave the inactive state based on a power saving configuration 1232. The inactive state component 1230 may be configured with a DRX configuration 1234 that indicates when to enter or leave the inactive state. The inactive state component 1230 may receive the satellite information from the cell selection component 1220 and determine coverage gaps 1236 during which the UE 1205 may need to be in the inactive state. The inactive state component 1230 may receive a user control 1238 (e.g., a signal from a power button) indicating when the UE 1205 needs to be in the inactive state. The inactive state component 1230 may provide a state signal to the access component 1250.

The cell search component 1240 may receive the set of selected cells from the cell selection component 1220 and the state signal from the inactive state component 1230. The cell search component 1240 may be configured to find a satellite cell from the plurality of satellite cells based on the acquisition information 730 when the state signal indicates that the UE 1205 is leaving the inactive state (e.g., at the second time 1142). The cell search component 1240 may be configured to perform a search for one or more selected cells. For instance, the cell search component 1240 may search for and detect an available satellite cell having at least one of a frequency, a Doppler shift, or an angle of elevation contained within the available set of cell frequencies, the range of Doppler frequency shift values or the range of elevation angles, respectively.

The access component 1250 may be configured to access the communication satellite that provides the satellite cell based on the acquisition information 730. In some implementations, the access component 1250 may include one or more of a satellite control component 1252 or a connection component 1254.

The satellite control component 1252 may adjust one or more parameters of the UE 1205 for communication with a selected communication satellite via a satellite cell. For example, the satellite control component 1252 may perform at least one of: adjusting a UE 1205 transmission frequency to match a frequency expected by the communication satellite; adjusting a UE 1205 transmission timing to match a transmission timing expected by the communication satellite; adjusting a UE 1205 reception frequency to match a frequency received by the UE 1205 from the communication satellite; adjusting an ARFCN used by the UE 1205 for reception of signals for the satellite cell from the communication satellite to match an ARFCN used for transmission of signals by the communication satellite for the satellite cell; or adjusting an angle of elevation, an angle of azimuth or both for an antenna array of the UE 1205 to match an angle of elevation, an angle of azimuth or both for the communication satellite at a location of the UE 1205.

The connection component 1254 may be configured to access the communication satellite providing the satellite cell based on the acquisition information 730. For example, the connection component 1254 may camp on the satellite cell or establish a connection to a serving PLMN via the satellite cell and the communication satellite. Camping on the cell may include receiving signals and information 1158 broadcast by the satellite cell such as SSBs and SIBs. Establishing a connection to the serving PLMN via the satellite cell and the communication satellite may include performing a RACH procedure by transmitting a RACH message 1166 to the communication satellite.

Figure 13:
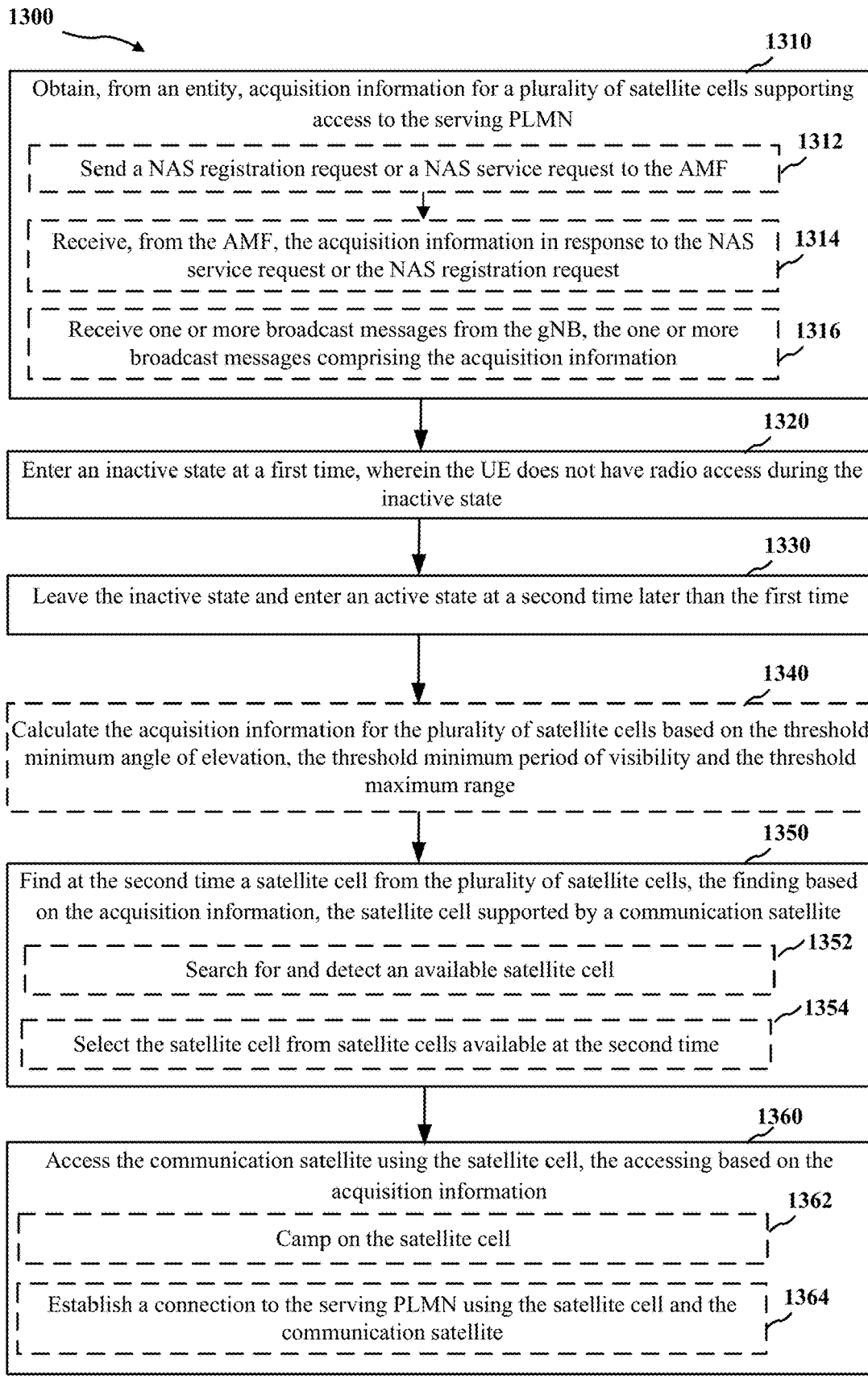
FIG. 13 is a flowchart illustrating an example method of acquiring a cell provided by an SV.

FIG. 13 is a flowchart illustrating an example method 1300 of supporting satellite wireless access by a user equipment (UE) to a serving public land mobile network (PLMN) such as a 5GCN 110. The method 1300 may be performed by the UE, such as the UE 105 or UE 1205, which may include the memory 744 and which may be the entire UE 105 or 1205 or a component of the UE 105 or 1205 such as the satellite cell acquisition component 740 and/or the processor 742. The method 1300 may be performed by the satellite cell acquisition component 740 in communication with the entity 750 and the SV 710. Optional blocks are shown with dashed lines.

At block 1310, the method 1300 may include obtaining, from an entity (e.g. the entity 750), acquisition information for a plurality of satellite cells supporting access to the serving PLMN. In an aspect, for example, the UE 105, and/or the processor 742 may execute the satellite cell acquisition component 740 and/or the acquisition information component 1210 to obtain, from an entity 750, acquisition information 730 for a plurality of satellite cells 810 supporting access to the serving PLMN. For example, the entity 750 may comprise the UE, a gNB providing access to the serving PLMN (e.g. a gNB 106, 202 or 307), an AMF (e.g. AMF 122) in the serving PLMN, a server in the serving PLMN, an Operations & Maintenance server for the serving PLMN, or a server for an OEM. For example, when the entity 750 is an AMF, at sub-block 1312, the block 1310 may include sending a NAS registration request 1112 or a NAS service request 1114 to the AMF. At sub-block 1314, in response to sub-block 1312, the block 1310 may include receiving, from the AMF, the acquisition information 730 in response to the NAS service request or the NAS registration request. As another example, at sub-block 1316, when the entity 750 is a gNB, the block 1310 may include receiving one or more broadcast messages 1124 from the gNB, the one or more broadcast messages 1124 comprising the acquisition information 730. Accordingly, the UE 105, the processor 742 executing the satellite cell acquisition component 740 and/or the acquisition information component 1210 may provide means for obtaining, from an entity, acquisition information for a plurality of satellite cells supporting access to the serving PLMN.

At block 1320, the method 1300 may include entering an inactive state at a first time. In an aspect, for example, the UE 105, and/or the processor 742 may execute the satellite cell acquisition component 740 and/or the inactive state component 1230 to enter an inactive state at a first time 1132. The UE does not have radio access during the inactive state. Accordingly, the UE 105, the processor 742 executing the satellite cell acquisition component 740 and/or the inactive state component 1230 may provide means for entering an inactive state at a first time.

At block 1330, the method 1300 may include leaving the inactive state and entering an active state at a second time later than the first time. In an aspect, for example, the UE 105, and/or the processor 742 may execute the satellite cell acquisition component 740 and/or the inactive state component 1230 to leave the inactive state and enter an active state at a second time 1142 later than the first time 1132.

Accordingly, the UE 105, the processor 742 executing the satellite cell acquisition component 740 and/or the inactive state component 1230 may provide means for leaving the inactive state and entering an active state at a second time later than the first time. In some implementations, the inactive state corresponds to at least one of a power saving mode, a discontinuous reception, a satellite coverage gap, or to a user invoked power off state for the UE, where the at least one of the power saving mode, the discontinuous reception, the satellite coverage gap or the power off state starts at the first time and ends at the second time.

In some implementations, the plurality of satellite cells corresponds to all satellite cells provided for the serving PLMN by communication satellites that, at any location in a coverage area of the serving PLMN, have a threshold minimum angle of elevation, a threshold minimum period of visibility and a threshold maximum range. The acquisition information for the plurality of satellite cells may then be based on at least one of the threshold minimum angle of elevation, the threshold minimum period of visibility and the threshold maximum range. For example, the acquisition information may include at least one of: an available set of cell frequencies; a range of Doppler frequency shift values for reception of signals by the UE; a range of elevation angles; a range of UE transmission frequency offsets; or a range of UE transmission timing offsets. At block 1340 (e.g. which may be performed prior to block 1310 when the entity is the UE and/or may be used for Solution 4 described for FIG. 10), the method 1300 may optionally include calculating the acquisition information for the plurality of satellite cells based on at least one of the threshold minimum angle of elevation, the threshold minimum period of visibility, and the threshold maximum range. In an aspect, for example, the UE 105, and/or the processor 742 may execute the satellite cell acquisition component 740 and/or the acquisition information component 1210 to calculate the acquisition information for the plurality of satellite cells based on at least one of the threshold minimum angle of elevation, the threshold minimum period of visibility, and the threshold maximum range. Accordingly, the UE 105, the processor 742 executing the satellite cell acquisition component 740 and/or the acquisition information component 1210 may provide means for calculating the acquisition information for the plurality of satellite cells based on at least one of the threshold minimum angle of elevation, the threshold minimum period of visibility, and the threshold maximum range.

At block 1350, the method 1300 may include finding at the second time a satellite cell from the plurality of satellite cells, the finding based on the acquisition information, the satellite cell supported by a communication satellite. In an aspect, for example, the UE 105, and/or the processor 742 may execute the satellite cell acquisition component 740 and/or the cell search component 1240 to find at the second time a satellite cell (e.g. cell 810-1) from the plurality of satellite cells 810, the finding based on the acquisition information 730, the satellite cell supported by a communication satellite (e.g., SV 710). For example, at sub-block 1352, in implementations where the method 1300 includes the block 1340, the block 1350 may include searching for and detecting an available satellite cell having at least one of a frequency, a Doppler shift, or an angle of elevation contained within the available set of cell frequencies, the range of Doppler frequency shift values or the range of elevation angles, respectively. Accordingly, the UE 105, the processor 742 executing the satellite cell acquisition component 740 and/or the cell search component 1240 may provide means for finding at the second time a satellite cell from the plurality of satellite cells, the finding based on the acquisition information, the satellite cell supported by a communication satellite.

In another example at sub-block 1354, the block 1350 may include selecting the satellite cell from satellite cells available at the second time in the plurality of satellite cells, where the satellite cell is selected based on characteristics of the satellite cell that are either acceptable or better than corresponding characteristics for other satellite cells in the satellite cells available at the second time. A characteristic that is either acceptable or better may comprise: (i) a lower range from the UE to the communication satellite than from the UE to communication satellites providing the other satellite cells in the satellite cells available at the second time; (ii) an angle of elevation from the UE to the communication satellite exceeding a threshold minimum; (iii) a longer time of availability for the satellite cell at a location of the UE than for the other satellite cells in the satellite cells available at the second time; (iv) a longer time of visibility for the communication satellite at the location of the UE than for the communication satellites providing the other satellite cells available at the second time; or (v) support of a tracking area for the serving PLMN that is part of a registration area for the UE. Accordingly, the UE 105, the processor 742 executing the satellite cell acquisition component 740 and/or the cell selection component 1220 or cell search component 1240 may provide means for selecting the satellite cell based on characteristics of the satellite cell that are either acceptable or better than corresponding characteristics for other satellite cells in the satellite cells available at the second time, where a characteristic that is either acceptable or better may comprise: (i) a lower range from the UE to the communication satellite than from the UE to communication satellites providing the other satellite cells in the satellite cells available at the second time; (ii) an angle of elevation from the UE to the communication satellite exceeding a threshold minimum; (iii) a longer time of availability for the satellite cell at a location of the UE than for the other satellite cells in the satellite cells available at the second time; (iv) a longer time of visibility for the communication satellite at the location of the UE than for the communication satellites providing the other satellite cells available at the second time; or (v) support of a tracking area for the serving PLMN that is part of a registration area for the UE.

At block 1360, the method 1300 may include accessing the communication satellite using the satellite cell, the accessing based on the acquisition information. In an aspect, for example, the UE 105, and/or the processor 742 may execute the satellite cell acquisition component 740 and/or the access component 1250 to access the communication satellite (e.g., SV 710) using the satellite cell 810, the accessing based on the acquisition information 730. For example, at sub-block 1362, the block 1360 may include camping on the satellite cell. As another example, at sub-block 1364, the block 1360 may include establishing a connection to the serving PLMN using the satellite cell and the communication satellite.

In some implementations, the block 1360 may include adjusting one or more communication parameters based on the acquisition information. For instance, the satellite control component 1252 may use the acquisition information to perform at least one of: adjusting a UE transmission frequency to match a frequency expected by the communication satellite; adjusting a UE transmission timing to match a transmission timing expected by the communication satellite; adjusting a UE reception frequency to match a frequency received by the UE from the communication satellite; adjusting an ARFCN used by the UE for reception of signals for the satellite cell from the communication satellite to match an ARFCN used for transmission of signals by the communication satellite for the satellite cell; or adjusting an angle of elevation, an angle of azimuth or both for an antenna array of the UE to match an angle of elevation, an angle of azimuth or both for the communication satellite at a location of the UE. Accordingly, the UE 105, the processor 742 executing the satellite cell acquisition component 740 and/or the access component 1250 may provide means for accessing the communication satellite using the satellite cell, the accessing based on the acquisition information.

In some implementations (e.g. for Solution 1 or Solution 2 described for FIG. 10), the acquisition information comprises information for one or more scheduled times applicable at a known location of the UE, where the information for each scheduled time of the one or more scheduled times comprises information for one or more satellite cells from the plurality of satellite cells available at the known location of the UE at each scheduled time. The information for each of the one or more satellite cells available at the known location of the UE may comprise at least one of: a global cell identification; a physical cell identification (PCI); an absolute radio frequency channel number (ARFCN); a Doppler frequency shift for reception of signals by the UE; an azimuth, an elevation or both of a communication satellite providing each of the one or more satellite cells at the known location of the UE; a duration of satellite cell availability at the known location of the UE; a duration of visibility of a communication satellite providing each of the one or more satellite cells at the known location of the UE; supported tracking area codes (TACs); a UE transmission frequency offset; or a UE transmission timing offset. The second time, for example, may be one of the scheduled times. The known location of the UE, for example, may correspond to an actual location of the UE at the second time with a maximum error of 5 kms, 10 kms, 20 kms or 50 kms. The scheduled times, for example, may comprise a sequence of periodic times, where the information for each of the one or more satellite cells available at the known location of the UE further comprises information for determining at least one variable characteristic for any time that is between one of the periodic times and an immediately following periodic time or an immediately preceding periodic time. The at least one variable characteristic may comprise: the Doppler frequency shift for reception of signals by the UE; the azimuth, the elevation or both of the communication satellite providing the each of the one or more satellite cells at the known location of the UE; the duration of the satellite cell availability at the known location of the UE; the duration of the visibility of the communication satellite providing each of the one or more satellite cells at the known location of the UE; the UE transmission frequency offset; or the UE transmission timing offset. In some implementations, determining the at least one variable characteristic (e.g. if the characteristic is a real or rational number) can be based on at least one of: interpolation of the at least one variable characteristic between the periodic time and the immediately following periodic time or the immediately preceding periodic time; information for a first order rate of change for the at least one variable characteristic; or information for a second order rate of change for the at least one variable characteristic. For example, the second time may comprise a time that is between a periodic time and an immediately following periodic time or an immediately preceding periodic time.

In some implementations (e.g. for Solution 3 described for FIG. 10), the acquisition information comprises at least one of: (i) orbital data for communications satellites supporting the plurality of satellite cells; (ii) an identification of the satellite cells in the plurality of satellite cells supported by each of the communication satellites; (iii) for each of the plurality of satellite cells, an indication of at least one of a cell global ID, a physical cell ID, an absolute radio frequency channel number (ARFCN), a duration of the satellite cell including a start time and stop time, supported tracking area codes and start and stop times, or a coverage area of the satellite cell; or (iv) some combination thereof. The coverage area may comprise at least one of: a fixed geographic area description plus a start time and stop time for the fixed geographic area; a geographic area plus a velocity for a moving coverage area; or information on cell beam direction of transmission, cell beam angular width, and whether communication satellite antennas are fixed or steerable. For example, the communications satellites supporting the plurality of satellite cells may be accessible from a particular geographic region or from a coverage area of the serving PLMN.

Figure 14:
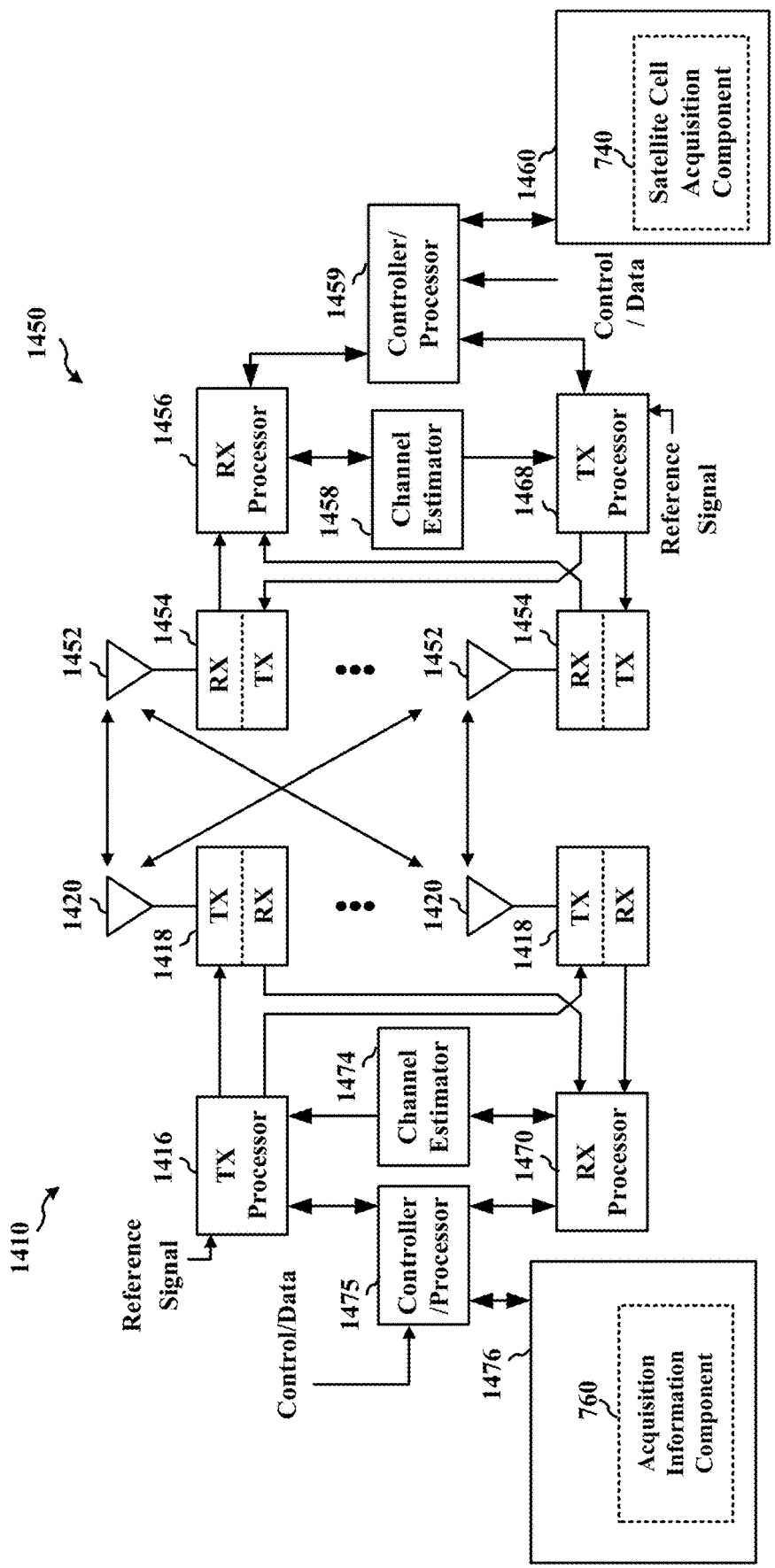
FIG. 14 is a diagram illustrating an example of a base station and UE in an access network.

FIG. 14 is a diagram of an example of a base station 1410 and a UE 1450 in an access network. The base station may correspond to a gNB 106, 202, 302 or 307, or to an ng-eNB 114, an ng-eNB-CU 308 or an eNB. The UE 1450 may correspond to a UE 105 (e.g. as in FIGS. 1-3). Communication between the base station 1410 and UE 1450 may be transferred with the assistance of an earth station 104 and/or an SV 102, 202, 302, 710 or 820 (not shown in FIG. 14). For example, the base station 1410 may include the functionality of an earth station 104 (e.g. which may be supported by one or more of TX processor 1416, RX processor 1470 and/or controller/processor 1475) and may exchange wireless signaling with UE 1450 via an SV 102, 202, 302, 710 or 820 (not shown in FIG. 14). Alternatively, the base station 1410 may be part of an SV 202, 302, 710 or 810 and may exchange wireless signaling with UE 1450 directly and without an intermediate entity.

In the DL, IP packets originating from a 5GCN 110 or EPC may be provided to a controller/processor 1475. The controller/processor 1475 may implement layer 3 and/or layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 1475 may provide RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 1416 and the receive (RX) processor 1470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 1416 may handle mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1474 may be used to determine the coding and modulation scheme, as well as for spatial processing. The channel estimate may be derived from a reference signal or channel condition feedback transmitted by the UE 1450. Each spatial stream may be provided to a different antenna 1420 via a separate transmitter 1418TX. Each transmitter 1418TX may modulate an RF carrier with a respective spatial stream for transmission.

At the UE 1450, each receiver 1454RX receives a signal through its respective antenna 1452. Each receiver 1454RX recovers information modulated onto an RF carrier and provides the information to the receive (RX) processor 1456. The TX processor 1468 and the RX processor 1456 implement layer 1 functionality associated with various signal processing functions. The RX processor 1456 may perform spatial processing on the information to recover any spatial streams destined for the UE 1450. If multiple spatial streams are destined for the UE 1450, they may be combined by the RX processor 1456 into a single OFDM symbol stream. The RX processor 1456 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 1410. These soft decisions may be based on channel estimates computed by the channel estimator 1458. The soft decisions are decoded and deinterleaved to recover the data and control signals that were originally transmitted by the base station 1410 on the physical channel. The data and control signals are provided to the controller/processor 1459, which implements layer 3 and layer 2 functionality.

The controller/processor 1459 can be associated with a memory 1460 that stores program codes and data. The memory 1460 may be referred to as a computer-readable medium. A non-transitory computer-readable medium excludes transitory signals. In the UL, the controller/processor 1459 provides demultiplexing between transport and logical channels, packet reassembly, deciphering, header decompression, and control signal processing to recover IP packets from the 5GCN 110 or EPC. The controller/processor 1459 is also responsible for error detection using an ACK or NACK protocol to support HARQ operations.

Similar to the functionality described in connection with the DL transmission by the base station 1410, the controller/ processor 1459 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 1458 from a reference signal or feedback transmitted by the base station 1410 may be used by the TX processor 1468 to select the appropriate coding and modulation schemes, and to facilitate spatial processing. The spatial streams generated by the TX processor 1468 may be provided to different antenna 1452 via separate transmitters 1454TX. Each transmitter 1454TX may modulate an RF carrier with a respective spatial stream for transmission.

The UL transmission may be processed at the base station 1410 in a manner similar to that described in connection with the receiver function at the UE 1450. Each receiver 1418RX receives a signal through its respective antenna 1420. Each receiver 1418RX recovers information modulated onto an RF carrier and provides the information to a RX processor 1470.

The controller/processor 1475 can be associated with a memory 1476 that stores program codes and data. The memory 1476 may be referred to as a computer-readable medium. In the UL, the controller/processor 1475 may provide demultiplexing between transport and logical channels, packet reassembly, deciphering, header decompression, control signal processing to recover IP packets from the UE 1450. IP packets from the controller/processor 1475 may be provided to the 5GCN 110 or EPC. The controller/ processor 1475 is also responsible for error detection using an ACK or NACK protocol to support HARQ operations.

At least one of the TX processor 1468, the RX processor 1456, and the controller/processor 1459 may be configured to perform aspects in connection with the satellite cell acquisition component 740 of FIGS. 7 and 12. For example, the memory 1460 may include executable instructions defining the satellite cell acquisition component 740 of FIGS. 7 and 12. The TX processor 1468, the RX processor 1456, and/or the controller/processor 1459 may be configured to execute the satellite cell acquisition component 740.

At least one of the TX processor 1416, the RX processor 1470, and the controller/processor 1475 may be configured to perform aspects in connection with the acquisition information component 760 of FIG. 7. For example, the memory 1476 may include executable instructions defining the acquisition information component 760. The TX processor 1416, the RX processor 1470, and/or the controller/processor 1475 may be configured to execute the acquisition information component 760.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

SOME FURTHER EXAMPLE CLAUSES

Implementation examples are described in the following numbered clauses:
1. A method of supporting satellite wireless access by a user equipment (UE) to a serving public land mobile network (PLMN), the method performed by the UE, the method comprising:
obtaining, from an entity, acquisition information for a plurality of satellite cells supporting access to the serving PLMN;
entering an inactive state at a first time, wherein the UE does not have radio access during the inactive state;
leaving the inactive state and entering an active state at a second time later than the first time;
finding at the second time a satellite cell from the plurality of satellite cells, the finding based on the acquisition information, the satellite cell supported by a communication satellite; and accessing the communication satellite using the satellite cell, the accessing based on the acquisition information.
2. The method of clause 1, wherein the entity comprises the UE, a gNB providing access to the serving PLMN, an AMF in the serving PLMN, a server in the serving PLMN, an Operations & Maintenance server for the serving PLMN, or a server for an OEM.
3. The method of clause 2, wherein the entity is the AMF, wherein obtaining the acquisition information comprises:
sending a NAS registration request or a NAS service request to the AMF; and
receiving, from the AMF, the acquisition information in response to the NAS service request or a NAS registration request.
4. The method of clause 2, wherein the entity is the gNB, wherein obtaining the acquisition information comprises:
receiving one or more broadcast messages from the gNB, the one or more broadcast messages comprising the acquisition information.
5. The method of any of clauses 1-4, wherein the inactive state corresponds to at least one of a power saving mode, a discontinuous reception, a satellite coverage gap, or to a user invoked power off state for the UE, wherein the at least one of the power saving mode, the discontinuous reception, the satellite coverage gap or the power off state starts at the first time and ends at the second time.
6. The method of any of clauses 1-5, wherein accessing the communication satellite comprises camping on the satellite cell or establishing a connection to the serving PLMN using the satellite cell and the communication satellite.
7. The method of any of clauses 1-6, wherein finding the satellite cell from the plurality of satellite cells comprises selecting the satellite cell from satellite cells available at the second time in the plurality of satellite cells, wherein the satellite cell is selected based on characteristics of the satellite cell that are either acceptable or better than corresponding characteristics for other satellite cells in the satellite cells available at the second time, wherein a characteristic that is either acceptable or better comprises:
a lower range from the UE to the communication satellite than from the UE to communication satellites providing the other satellite cells in the satellite cells available at the second time;
an angle of elevation from the UE to the communication satellite exceeding a threshold minimum;
a longer time of availability for the satellite cell at a location of the UE than for the other satellite cells in the satellite cells available at the second time;
a longer time of visibility for the communication satellite at the location of the UE than for the communication satellites providing the other satellite cells available at the second time; or support of a tracking area for the serving PLMN that is part of a registration area for the UE.
8. The method of any of clauses 1-7, wherein accessing the communication satellite using the satellite cell comprises using the acquisition information to perform at least one of:
adjusting a UE transmission frequency to match a frequency expected by the communication satellite;
adjusting a UE transmission timing to match a transmission timing expected by the communication satellite;
adjusting a UE reception frequency to match a frequency received by the UE from the communication satellite;
adjusting an absolute radio frequency channel number (ARFCN) used by the UE for reception of signals for the satellite cell from the communication satellite to match an ARFCN used for transmission of signals by the communication satellite for the satellite cell; or
adjusting an angle of elevation, an angle of azimuth or both for an antenna array of the UE to match an angle of elevation, an angle of azimuth or both for the communication satellite at a location of the UE.
9. The method of any of clauses 1-8, wherein the acquisition information comprises information for one or more scheduled times applicable at a known location of the UE, wherein the information for each scheduled time of the one or more scheduled times comprises information for one or more satellite cells from the plurality of satellite cells available at the known location of the UE at each scheduled time, wherein the information for each of the one or more satellite cells available at the known location of the UE comprises at least one of:
a global cell identification;
a physical cell identification (PCI);
an absolute radio frequency channel number (ARFCN);
a Doppler frequency shift for reception of signals by the UE;
an azimuth, an elevation or both of a communication satellite providing each of the one or more satellite cells at the known location of the UE;
a duration of satellite cell availability at the known location of the UE;
a duration of visibility of a communication satellite providing each of the one or more satellite cells at the known location of the UE;
supported tracking area codes (TACs);
a UE transmission frequency offset; or
a UE transmission timing offset.
10. The method of clause 9, wherein the second time is one of the scheduled times.
11. The method of clause 9 or 10, wherein the known location of the UE corresponds to an actual location of the UE at the second time with a maximum error of 5 kms, 10 kms, 20 kms or 50 kms.

12. The method of any of clauses 9-11, wherein the scheduled times comprise a sequence of periodic times, wherein the information for each of the one or more satellite cells available at the known location of the UE further comprises information for determining at least one variable characteristic for any time that is between one of the periodic times and an immediately following periodic time or an immediately preceding periodic time, wherein the at least one variable characteristic comprises:
the Doppler frequency shift for reception of signals by the UE;
the azimuth, the elevation or both of the communication satellite providing the each of the one or more satellite cells at the known location of the UE;
the duration of the satellite cell availability at the known location of the UE;
the duration of the visibility of the communication satellite providing each of the one or more satellite cells at the known location of the UE;
the UE transmission frequency offset; or
the UE transmission timing offset.

13. The method of clause 12, wherein determining the at least one variable characteristic is based on at least one of:
interpolation of the at least one variable characteristic between the periodic time and the immediately following periodic time or the immediately preceding periodic time;
information for a first order rate of change for the at least one variable characteristic; or
information for a second order rate of change for the at least one variable characteristic.

14. The method of clause 12 or 13, wherein the second time comprises a time that is between a periodic time and an immediately following periodic time or an immediately preceding periodic time.

15. The method of any of clauses 1-8, wherein the acquisition information comprises at least one of:
orbital data for communications satellites supporting the plurality of satellite cells;
an identification of the satellite cells in the plurality of satellite cells supported by each of the communication satellites;
for each of the plurality of satellite cells, an indication of at least one of a cell global ID, a physical cell ID, an absolute radio frequency channel number (ARFCN), a duration of the satellite cell including a start time and stop time, supported tracking area codes and start and stop times, or a coverage area of the satellite cell; or some combination thereof.

16. The method of clause 15, wherein the coverage area comprises at least one of:
a fixed geographic area description plus a start time and stop time for the fixed geographic area;
a geographic area plus a velocity for a moving coverage area; or
information on cell beam direction of transmission, cell beam angular width, and whether communication satellite antennas are fixed or steerable.

17. The method of clause 15 or 16, wherein the communications satellites supporting the plurality of satellite cells are accessible from a particular geographic region or from a coverage area of the serving PLMN.

18. The method of any of clauses 1-8, wherein the plurality of satellite cells corresponds to all satellite cells provided for the serving PLMN by communication satellites that, at any location in a coverage area of the serving PLMN, have a threshold minimum angle of elevation, a threshold minimum period of visibility and a threshold maximum range, wherein the acquisition information for the plurality of satellite cells is based on the threshold minimum angle of elevation, the threshold minimum period of visibility and the threshold maximum range.

19. The method of clause 18, wherein the acquisition information comprises at least one of:
an available set of cell frequencies;
a range of Doppler frequency shift values for reception of signals by the UE;
a range of elevation angles;
a range of UE transmission frequency offsets; or
a range of UE transmission timing offsets.

20. The method of clause 19, wherein finding the satellite cell comprises searching for and detecting an available satellite cell having at least one of a frequency, a Doppler shift, or an angle of elevation contained within the available set of cell frequencies, the range of Doppler frequency shift values or the range of elevation angles, respectively.

21. The method of any of clauses 18-20, further comprising calculating the acquisition information for the plurality of satellite cells based on the threshold minimum angle of elevation, the threshold minimum period of visibility and the threshold maximum range.

22. An apparatus for supporting satellite wireless access by a user equipment (UE) to a serving public land mobile network (PLMN), comprising:
a memory storing computer-executable instructions; and
at least one processor coupled to the memory and configured to execute the computer-executable instructions to perform the method of any of clauses 1-21.

29. An apparatus for supporting satellite wireless access by a user equipment (UE) to a serving public land mobile network (PLMN), comprising means for performing the method of any of clauses 1-21.

30. A non-transitory computer-readable medium storing computer executable code for supporting satellite wireless access by a user equipment (UE) to a serving public land mobile network (PLMN), the code when executed by a processor causes the processor to perform the method of any of clauses 1-21.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of supporting satellite wireless access by a user equipment (UE) to a serving public land mobile network (PLMN), the method performed by the UE, the method comprising:
    obtaining, from an entity, acquisition information for a plurality of satellite cells supporting access to the serving PLMN, wherein the plurality of satellite cells corresponds to all satellite cells provided for the serving PLMN by communication satellites that, at any location in a coverage area of the serving PLMN, have a threshold minimum angle of elevation, a threshold minimum period of visibility and a threshold maximum range, wherein the acquisition information for the plurality of satellite cells is based on the threshold minimum angle of elevation, the threshold minimum period of visibility and the threshold maximum range;
    entering an inactive state at a first time, wherein the UE does not have radio access during the inactive state;
    leaving the inactive state and entering an active state at a second time later than the first time;
    finding at the second time a satellite cell from the plurality of satellite cells, the finding based on the acquisition information, the satellite cell supported by a communication satellite; and
    accessing the communication satellite using the satellite cell, the accessing based on the acquisition information.

2. The method of claim 1, wherein the entity comprises the UE, a gNB providing access to the serving PLMN, an AMF in the serving PLMN, a server in the serving PLMN, an Operations & Maintenance server for the serving PLMN, or a server for an OEM.

3. The method of claim 2, wherein the entity is the AMF, wherein obtaining the acquisition information comprises:
    sending a NAS registration request or a NAS service request to the AMF; and
    receiving, from the AMF, the acquisition information in response to the NAS service request or a NAS registration request.

4. The method of claim 2, wherein the entity is the gNB, wherein obtaining the acquisition information comprises:
    receiving one or more broadcast messages from the gNB, the one or more broadcast messages comprising the acquisition information.

5. The method of claim 1, wherein the inactive state corresponds to at least one of a power saving mode, a discontinuous reception, a satellite coverage gap, or to a user invoked power off state for the UE, wherein the at least one of the power saving mode, the discontinuous reception, the satellite coverage gap or the power off state starts at the first time and ends at the second time.

6. The method of claim 1, wherein accessing the communication satellite comprises camping on the satellite cell or establishing a connection to the serving PLMN using the satellite cell and the communication satellite.

7. The method of claim 1, wherein finding the satellite cell from the plurality of satellite cells comprises selecting the satellite cell from satellite cells available at the second time in the plurality of satellite cells, wherein the satellite cell is selected based on characteristics of the satellite cell that are either acceptable or better than corresponding characteristics for other satellite cells in the satellite cells available at the second time, wherein a characteristic that is either acceptable or better comprises:
    a lower range from the UE to the communication satellite than from the UE to communication satellites providing the other satellite cells in the satellite cells available at the second time;
    an angle of elevation from the UE to the communication satellite exceeding a threshold minimum;
    a longer time of availability for the satellite cell at a location of the UE than for the other satellite cells in the satellite cells available at the second time;
    a longer time of visibility for the communication satellite at the location of the UE than for the communication satellites providing the other satellite cells available at the second time; or
    support of a tracking area for the serving PLMN that is part of a registration area for the UE.

8. The method of claim 1, wherein accessing the communication satellite using the satellite cell comprises using the acquisition information to perform at least one of:
    adjusting a UE transmission frequency to match a frequency expected by the communication satellite;
    adjusting a UE transmission timing to match a transmission timing expected by the communication satellite;
    adjusting a UE reception frequency to match a frequency received by the UE from the communication satellite;
    adjusting an absolute radio frequency channel number (ARFCN) used by the UE for reception of signals for the satellite cell from the communication satellite to match an ARFCN used for transmission of signals by the communication satellite for the satellite cell; or
    adjusting an angle of elevation, an angle of azimuth or both for an antenna array of the UE to match an angle of elevation, an angle of azimuth or both for the communication satellite at a location of the UE.

9. The method of claim 1, wherein the acquisition information comprises information for one or more scheduled times applicable at a known location of the UE, wherein the information for each scheduled time of the one or more scheduled times comprises information for one or more satellite cells from the plurality of satellite cells available at the known location of the UE at each scheduled time, wherein the information for each of the one or more satellite cells available at the known location of the UE comprises at least one of:
    a global cell identification;
    a physical cell identification (PCI);
    an absolute radio frequency channel number (ARFCN);
    a Doppler frequency shift for reception of signals by the UE;
    an azimuth, an elevation or both of a communication satellite providing each of the one or more satellite cells at the known location of the UE;
    a duration of satellite cell availability at the known location of the UE;

a duration of visibility of a communication satellite providing each of the one or more satellite cells at the known location of the UE;
supported tracking area codes (TACs);
a UE transmission frequency offset; or
a UE transmission timing offset.

10. The method of claim 9, wherein the second time is one of the scheduled times.

11. The method of claim 9, wherein the known location of the UE corresponds to an actual location of the UE at the second time with a maximum error of 5 kms, 10 kms, 20 kms or 50 kms.

12. The method of claim 9, wherein the scheduled times comprise a sequence of periodic times, wherein the information for each of the one or more satellite cells available at the known location of the UE further comprises information for determining at least one variable characteristic for any time that is between one of the periodic times and an immediately following periodic time or an immediately preceding periodic time, wherein the at least one variable characteristic comprises:
the Doppler frequency shift for reception of signals by the UE;
the azimuth, the elevation or both of the communication satellite providing the each of the one or more satellite cells at the known location of the UE;
the duration of the satellite cell availability at the known location of the UE;
the duration of the visibility of the communication satellite providing each of the one or more satellite cells at the known location of the UE;
the UE transmission frequency offset; or
the UE transmission timing offset.

13. The method of claim 12, wherein determining the at least one variable characteristic is based on at least one of:
interpolation of the at least one variable Characteristic between the periodic time and the immediately following periodic time or the immediately preceding periodic time;
information for a first order rate of change for the at least one variable Characteristic; or
information for a second order rate of change for the at least one variable characteristic.

14. The method of claim 12, wherein the second time comprises a time that is between a periodic time and an immediately following periodic time or an immediately preceding periodic time.

15. The method of claim 1, wherein the acquisition information comprises at least one of:
orbital data for communications satellites supporting the plurality of satellite cells;
an identification of the satellite cells in the plurality of satellite cells supported by each of the communication satellites;
for each of Me plurality of satellite cells, an indication of at least one of a cell global ID, a physical cell ID, an absolute radio frequency channel number (ARFCN), a duration of the satellite cell including a start time and stop time, supported tracking area codes and start and stop times, or a coverage area of the satellite cell; or some combination thereof.

16. The method of claim 15, wherein the coverage area comprises at least one of:
a fixed geographic area description plus a start time and stop time for the fixed geographic area;
a geographic area plus a velocity for a moving coverage area; or
information on cell beam direction of transmission, cell beam angular width, and whether communication satellite antennas are fixed or steerable.

17. The method of claim 15, wherein the communications satellites supporting the plurality of satellite cells are accessible from a particular geographic region or from a coverage area of the serving PLMN.

18. The method of claim 1, wherein the acquisition information comprises at least one of:
an available set of cell frequencies;
a range of Doppler frequency shift values for reception of signals by the UE;
a range of elevation angles;
a range of UE transmission frequency offsets; or
a range of UE transmission timing offsets.

19. The method of claim 18, wherein finding the satellite cell comprises searching for and detecting an available satellite cell having at least one of a frequency, a Doppler shift, or an angle of elevation contained within the available set of cell frequencies, the range of Doppler frequency shift values or the range of elevation angles, respectively.

20. The method of claim 1, further comprising calculating the acquisition information for the plurality of satellite cells based on the threshold minimum angle of elevation, the threshold minimum period of visibility and the threshold maximum range.

21. An apparatus for supporting satellite wireless access by a user equipment (LIE) to a serving public land mobile network (PLMN), comprising:
one or more memories, individually or in combination, having computer executable instructions; and
one or more processors, each coupled to at least one of the one or more memories and configured to execute the computer-executable instructions to:
obtain, from an entity, acquisition information for a plurality of satellite cells supporting access to the serving NAN, wherein the plurality of satellite cells corresponds to all satellite cells provided for the serving PLMN by communication satellites that, at any location in a coverage area of the serving PLMN have a threshold minimum angle of elevation, a threshold minimum period of visibility and a threshold maximum range, wherein the acquisition information for the plurality of satellite cells is based on the threshold minimum angle of elevation, the threshold minimum period of visibility and the threshold maximum range;
enter an inactive state at a first time, wherein the UE does not have radio access during the inactive state;
leave the inactive state and entering an active state at a second time later than the first time;
find at the second time a satellite cell from the plurality of satellite cells, the finding based on the acquisition information, the satellite cell supported by a communication satellite; and
access the communication satellite using the satellite cell, the accessing based on the acquisition information.

22. The apparatus of claim 21, wherein to find the satellite cell from the plurality of satellite cells, the one or more processors, individually or in combination are configured to select the satellite cell from satellite cells available at the second time in the plurality of satellite cells, wherein the satellite cell is selected based on characteristics of the satellite cell that are either acceptable or better than corresponding characteristics for other satellite cells in the satellite cells available at the second time, wherein a characteristic that is either acceptable or better comprises:
- a lower range from the UE to the communication satellite than from the UE to communication satellites providing the other satellite cells in the satellite cells available at the second time;
- an angle of elevation from the UE to the communication satellite exceeding a threshold minimum;
- a longer time of availability for the satellite cell at a location of the UE than for the other satellite cells in the satellite cells available at the second time;
- a longer time of visibility for the communication satellite at the location of the UE than for the communication satellites providing the other satellite cells available at the second time; or
- support of a tracking area for the serving PLMN that is part of a registration area for the UE.

23. The apparatus of claim 21, wherein the acquisition information comprises information for one or more scheduled times applicable at a known location of the UE, wherein the information for each scheduled time of the one or more scheduled times comprises information for one or more satellite cells from the plurality of satellite cells available at the known location of the UE at each scheduled time, wherein the information for each of the one or more satellite cells available at the known location of the UE comprises at least one of:
- a global cell identification;
- a physical cell identification (PCI);
- an absolute radio frequency channel number (ARFCN);
- a Doppler frequency shill for reception of signals by the UE;
- an azimuth, an elevation or both of a communication satellite providing the each of the one or more satellite cells at the known location of the UE;
- a duration of satellite cell availability at the known location of the UE;
- a duration of visibility of a communication satellite providing the each of the one or more satellite cells at the known location of the UE;
- supported tracking area codes (TACs);
- a UE transmission frequency offset; or
- a UE transmission timing offset.

24. The apparatus of claim 23, wherein the scheduled times comprise a sequence of periodic times, wherein the information for each of the one or more satellite cells available at the known location of the UE further comprises information for determining at least one variable characteristic for any time that is between one of the periodic times and an immediately following periodic time or an immediately preceding periodic time, wherein the at least one variable characteristic comprises:
- the Doppler frequency shift for reception of signals by the UE;
- the azimuth, the elevation or both of the communication satellite providing the each of the one or more satellite cells at the known location of the UE;
- the duration of the satellite cell availability at the known location of the UE;
- the duration of the visibility of the communication satellite providing each of the one or more satellite cells at the known location of the UE;
- the UE transmission frequency offset; or
- the UE transmission timing offset.

25. The apparatus of claim 21, wherein the acquisition information comprises at least one of:
- orbital data for communications satellites supporting the plurality of satellite cells;
- an identification of the satellite cells in the plurality of satellite cells supported by each of the communication satellites;
- for each of the plurality of satellite cells, an indication of at least one of a cell global ID, a physical cell ID, an Absolute radio frequency channel number (ARFCN), a duration of the satellite cell including a start time and stop time, supported tracking area codes and start and stop times, or a coverage area of the satellite cell; or
- some combination thereof.

26. The apparatus of claim 21, wherein the acquisition information comprises at least one of:
- an available set of cell frequencies;
- a range of Doppler frequency shift values for reception of signals by the UE;
- a range of elevation angles;
- a range of UE transmission frequency offsets; or
- a range of UE transmission timing offsets.

27. An apparatus for supporting satellite wireless access by a user equipment (UE) to a serving public land mobile network (PLMN), comprising:
- means for obtaining, from an entity, acquisition information for a plurality of satellite cells supporting access to the serving PLMN, wherein the plurality of satellite cells corresponds to all satellite cells provided for the serving PLMN by communication satellites that, at any location in a coverage area of the serving PLMN, have a threshold minimum angle of elevation, a threshold minimum period of visibility and a threshold maximum range, wherein the acquisition information for the plurality of satellite cells is based on the threshold minimum angle of elevation, the threshold minimum period of visibility and the threshold maximum range;
- means for entering an inactive state at a first time and leaving the inactive state and entering an active state at a second time later than the first time, wherein the UE does not have radio access during the inactive state;
- means for finding at the second time a satellite cell from the plurality of satellite cells, the finding based on the acquisition information, the satellite cell supported by a communication satellite; and
- means for accessing the communication satellite using the satellite cell, the accessing based on the acquisition information.

28. One or more non-transitory computer-readable medium media having computer executable code stored thereon for supporting satellite wireless access by a user equipment (UE) to a serving public land mobile network (PLMN), the code when executed by one or more processors causes the one or more processors, individually or in combination, to:
- obtain, from an entity, acquisition information, for a plurality of satellite cells supporting access to the serving PLMN, wherein the plurality of satellite cells corresponds to all satellite cells provided for the serving PLMN by communication satellites that, at any location in a coverage area of the serving PLMN, have a threshold minimum angle of elevation, a threshold minimum period of visibility and a threshold maximum range, wherein the acquisition information for the plurality of satellite cells is based on the threshold minimum angle of elevation, the threshold minimum period of visibility and the threshold maximum range;
- enter an inactive state at a first time, wherein the UE does not have radio access during the inactive state;

leave the inactive state and entering an active state at a second time later than the first time;

find at the second time a satellite cell from the plurality of satellite cells based on the acquisition information, the satellite cell supported by a communication satellite; and access the communication satellite using the satellite cell based on the acquisition information.

29. The one or more non-transitory computer-readable media of claim 28, wherein the code to find the satellite cell from the plurality of satellite cells comprises code to select the satellite cell from satellite cells available at the second time in the plurality of satellite cells based on characteristics of the satellite cell that are either acceptable or better than corresponding characteristics for other satellite cells in the satellite cells available at the second time, wherein a characteristic that is either acceptable or better comprises:

a lower range from the UE to the communication satellite than from the UE to communication satellites providing the other satellite cells in the satellite cells available at the second time;

an angle of elevation from the UE to the communication satellite exceeding a threshold minimum;

a longer time of availability for the satellite cell at a location of the UE than for the other satellite cells in the satellite cells available at the second time;

a longer time of visibility for the communication satellite at the location of the UE than for the communication satellites providing the other satellite cells available at the second time; or support of a tracking area for the serving PLMN that is part of a registration area for the UE.

30. The apparatus of claim 27, wherein the means for finding the satellite cell from the plurality of satellite cells is configured to select the satellite cell from satellite cells available at the second time in the plurality of satellite cells based on characteristics of the satellite cell that are either acceptable or better than corresponding characteristics for other satellite cells in the satellite cells available at the second time, wherein a characteristic that is either acceptable or better comprises:

a lower range from the UE to the communication satellite than from the UE to communication satellites providing the other satellite cells in the satellite cells available at the second time;

an angle of elevation from the UE to the communication satellite exceeding a threshold minimum;

a longer time of availability for the satellite cell at a location of the UE than for the other satellite cells in the satellite cells available at the second time;

a longer time of visibility for the communication satellite at the location of the UE than for the communication satellites providing the other satellite cells available at the second time; or support of a tracking area for the serving PLMN that is part of a registration area for the UE.

\* \* \* \* \*